United States Patent
Ohara

(10) Patent No.: US 10,963,761 B2
(45) Date of Patent: Mar. 30, 2021

(54) RECORDING APPARATUS, RECORDING METHOD, AND RECORDING CONTROLLING DEVICE FOR PRINTING CODE INFORMATION

(71) Applicant: SEIKO EPSON CORPORATION, Tokyo (JP)

(72) Inventor: Eiichi Ohara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/535,226

(22) Filed: Aug. 8, 2019

(65) Prior Publication Data
US 2020/0050908 A1 Feb. 13, 2020

(30) Foreign Application Priority Data
Aug. 10, 2018 (JP) .............................. JP2018-151272

(51) Int. Cl.
*G06K 15/10* (2006.01)
*B41J 2/045* (2006.01)
*B41J 3/01* (2006.01)
*G06K 1/12* (2006.01)

(52) U.S. Cl.
CPC ........ *G06K 15/105* (2013.01); *B41J 2/04501* (2013.01); *B41J 3/01* (2013.01); *G06K 1/121* (2013.01)

(58) Field of Classification Search
CPC .... G06K 15/105; G06K 1/121; G06K 15/107; B41J 2/04501; B41J 3/01; B41J 2/2132; B41J 19/145; B41J 19/147; B41J 19/142; B41J 2/01; B41J 2/205; B41J 29/38
See application file for complete search history.

(56) References Cited

U.S. PATENT DOCUMENTS

2018/0065359 A1 3/2018 Yamaguchi et al.

FOREIGN PATENT DOCUMENTS

| JP | 2005-047168 A | 2/2005 |
| JP | 2018-036984 A | 3/2018 |
| JP | 2018-041221 A | 3/2018 |

OTHER PUBLICATIONS

The Extended European Search Report for the corresponding European Patent Application No. 19190713.8 dated Jan. 13, 2020.

*Primary Examiner* — Bradley W Thies
(74) *Attorney, Agent, or Firm* — Global IP Counselors, LLP

(57) ABSTRACT

A recording system records a recording image based on image data by repeating a pass operation in which a nozzle row discharges ink while moving relatively to a recording medium in a main scanning direction and a transport operation in which the nozzle row and the recording medium relatively move in a sub scanning direction intersecting the main scanning direction. The recording system includes a code detecting unit that detects an area where code information included in the image data is located, and a recording controller that controls the pass operation and the transport operation based on the image data and a result of the detection by the code detecting unit. The recording controller controls such that the number of times of the pass operation of recording the area is smaller than that of the pass operation of recording an area adjacent to the area in the main scanning direction.

8 Claims, 13 Drawing Sheets

RECORDING APPARATUS, RECORDING METHOD, AND RECORDING CONTROLLING DEVICE FOR PRINTING CODE INFORMATION

The present application is based on, and claims priority from JP Application Serial Number 2018-151272, filed Aug. 10, 2018, the disclosure of which is hereby incorporated by reference herein in its entirety.

BACKGROUND

1. Technical Field

The present disclosure relates to a recording apparatus that performs recording by discharging liquid, a recording method in which recording is performed by discharging liquid, and a recording controlling device that controls the recording apparatus.

2. Related Art

In a serial-type ink jet printer, a pass operation in which ink droplets are discharged while a head, on which a nozzle row that discharges the ink droplets to a recording medium (a printing medium) is formed, reciprocates (performs main scanning) in a main scanning direction and a transport operation in which the recording medium moves in a transport direction (a sub scanning direction) intersecting the main scanning direction are alternately repeated. Thus, dots (a dot row) aligned in the main scanning direction are formed in the transport direction, and an image is formed on the recording medium.

In such a serial-type ink jet printer, by increasing the number of times (the number of pass) of the pass operation to a predetermined area on the recording medium, it is possible to improve resolution and color development and improve printing quality.

Further, in the serial-type ink jet printer, a printing time can be shortened by performing the recording by the main scanning in both directions of the head. At this time, a phenomenon may occur in which an impact position of the dot discharged to correspond to a predetermined position by the main scanning of the head in a forward direction and an impact position of the dot discharged to correspond to the predetermined position by the main scanning in a backward direction deviate from each other. In a state in which there is the deviation between the impact positions of the dots, when code information (for example, information configured with a barcode or the like) is recorded, a dimension and a shape of an element constituting the code are distorted (for example, in the case of the barcode, the width of the bar is thicker than necessary and the outline of the bar is shaken), and thus code quality is reduced. Low-quality code may cause poor reading when code information is read.

In contrast, an ink jet recording apparatus is disclosed in JP-A-2005-47168 in which presence or absence of the code information in the data to be recorded is identified using the next main scanning. In the ink jet recording apparatus, when the code information is included, unidirectional recording is performed, and otherwise, bidirectional recording is performed. Thus, a reduction in the code quality caused by the deviation between the impact positions due to a difference in the main scanning direction.

However, in the ink jet recording apparatus disclosed in JP-A-2005-47168, when the number of passes increases to improve printing quality, the number of passes for recording code information also increases (the number of passes increases even in unidirectional recording). Thus, for example, the deviation between the impact positions of the dots, such as a head mounting error, a recording medium transport error, and a cock ring of the recording medium, which occurs as the recording is performed by a plurality of pass operations, cannot be suppressed, and quality of the code information is reduced. That is, the quality of the code information and the printing quality cannot be improved at the same time.

SUMMARY

A recording apparatus according to an aspect of the present disclosure is a recording apparatus for recording a recording image based on image data by repeating a pass operation in which a nozzle group discharges ink while moving relatively to a recording medium in a main scanning direction and a transport operation in which the nozzle group and the recording medium relatively move in a sub scanning direction intersecting the main scanning direction, the apparatus including a code detecting unit that detects a first area where code information included in the image data is located, and a recording controller that controls the pass operation and the transport operation based on the image data and a result of the detection by the code detecting unit, in which the recording controller controls such that the number of times of the pass operation of recording the first area is smaller than the number of times of the pass operation of recording a second area adjacent to the first area in the main scanning direction.

In the recording apparatus, the recording controller may control to record at least a part of the first area in the one pass operation.

In the recording apparatus, the recording controller may control to record the first area at a recording resolution that is less than a recording resolution of the second area.

In the recording apparatus, the recording controller may control such that when the first area cannot be recorded by the one pass operation, the first area is recorded by a first pass operation and a second pass operation after the first pass operation, and the first pass operation and the second pass operation are performed in the same main scanning direction.

In the recording apparatus, the recording controller may control such that when the first area cannot be recorded by the one pass operation, the first area is recorded by a first pass operation and a second pass operation after the first pass operation, and the first pass operation and the second pass operation are performed in different main scanning directions.

In the recording apparatus, the recording controller may control such that the number of times of the pass operation of recording a third area adjacent to the first area or the second area in the sub scanning direction is equal to the number of times of the pass operation of recording the second area.

A recording method according to another aspect of the present disclosure is a recording method of recording a recording image based on image data by repeating a pass operation in which a nozzle group discharges ink while moving relatively to a recording medium in a main scanning direction and a transport operation in which the nozzle group and the recording medium relatively move in a sub scanning direction intersecting the main scanning direction, the method including a code detecting step of detecting a first area where code information included in the image data is located, and a recording controlling step of controlling the pass operation and the transport operation based on the image data and a result of the detection in the code detecting step, in which in the recording controlling step, control is performed such that the number of times of the pass operation of recording the first area is smaller than the number of times of the pass operation of recording a second area adjacent to the first area in the main scanning direction.

A recording controlling device according to still another aspect of the present disclosure is a recording controlling device for controlling a recording apparatus for recording a recording image based on image data by repeating a pass operation in which a nozzle group discharges ink while moving relatively to a recording medium in a main scanning direction and a transport operation in which the nozzle group and the recording medium relatively move in a sub scanning direction intersecting the main scanning direction, the device including a code detecting unit that detects a first area where code information included in the image data is located and a recording controller that controls the pass operation and the transport operation based on the image data and a result of the detection by the code detecting unit, in which the recording controller controls such that the number of times of the pass operation of recording the first area is smaller than the number of times of the pass operation of recording a second area adjacent to the first area in the main scanning direction.

DESCRIPTION OF EXEMPLARY EMBODIMENTS

Hereinafter, embodiments embodying the present disclosure will be described with reference to the drawings. Hereinafter, an embodiment of the present disclosure does not limit the present disclosure. In the following drawings, in order to make description easy to understand, the drawings may be made using a scale that is different from an actual scale. Further, in coordinates added to the drawings, a Z axis direction is set as an up-down direction, a +Z direction is set as an upward direction, an X axis direction is set as a front-rear direction, a −X direction is set as a forward direction, a Y axis direction is set as a left-right direction, a +Y direction is set as a leftward direction, and an X-Y plane is set as a horizontal plane.

Embodiment 1

Figure 1:
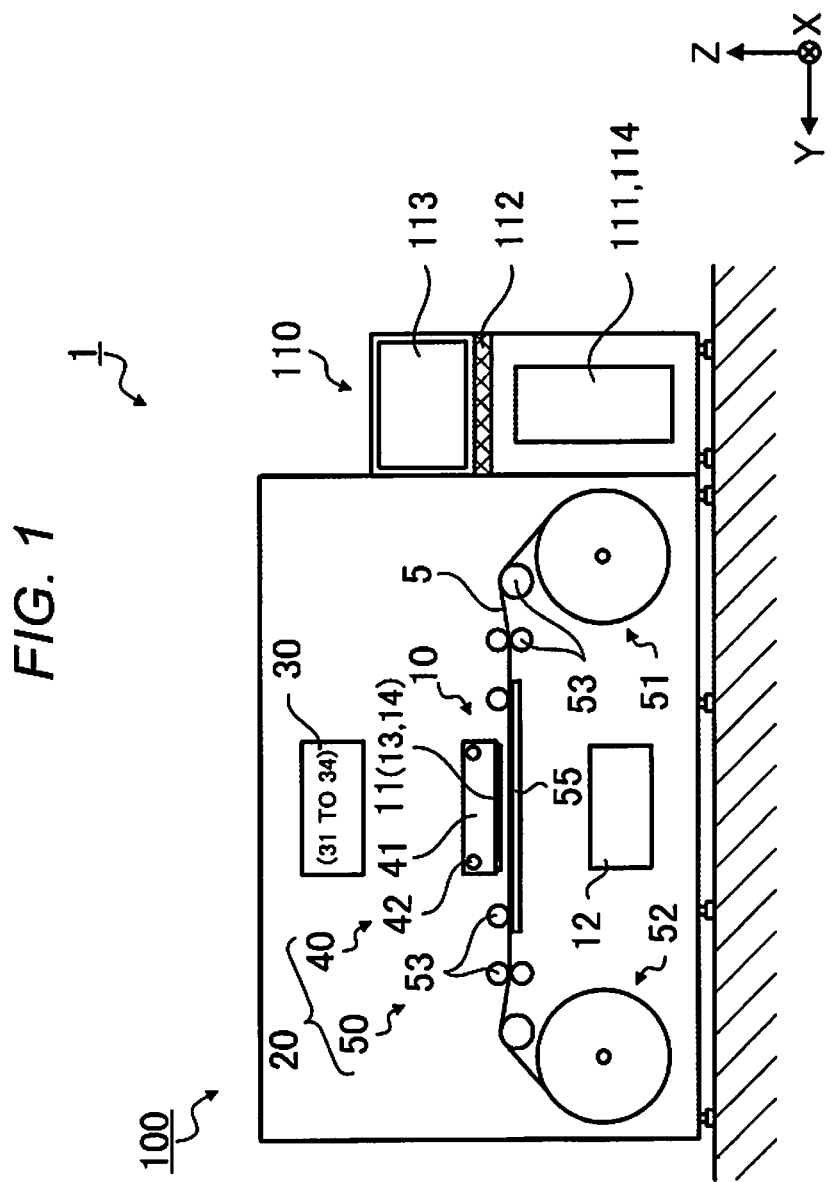
FIG. 1 is a front view showing a configuration of a recording apparatus according to Embodiment 1.
Figure 2:
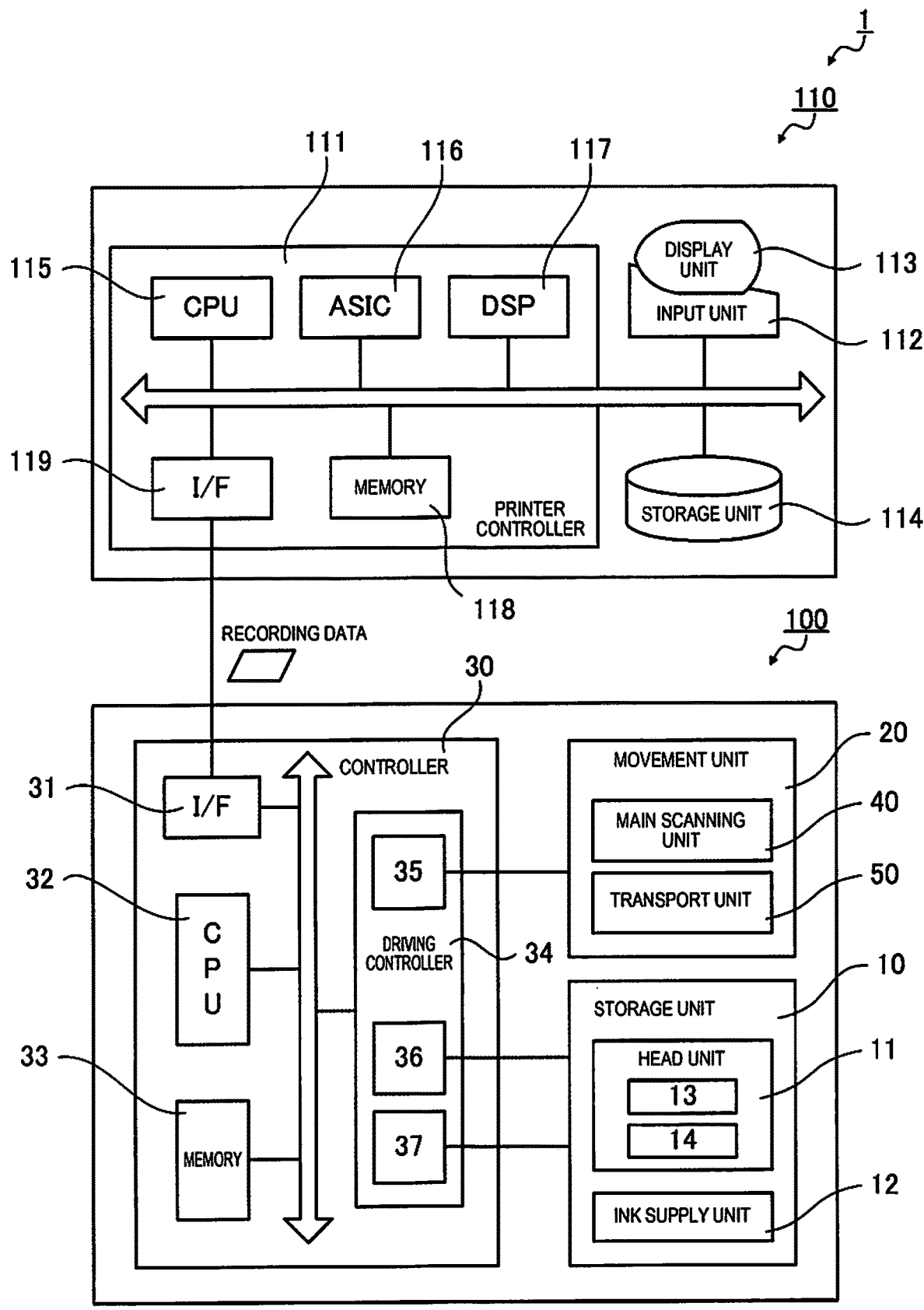
FIG. 2 is a block diagram showing the configuration of the recording apparatus according to Embodiment 1.

FIG. 1 is a front view showing a configuration of a recording system 1 as a "recording apparatus" according to Embodiment 1, and FIG. 2 is a block diagram showing the same configuration.

The recording system 1 is configured with a printer 100 and a recording controller 110 connected to the printer 100. The printer 100 is an ink jet printer that records a desired image (a recording image) on a long recording medium 5 supplied in a rolled state based on recording data received from the recording controller 110.

For example, high quality paper, cast paper, art paper, coated paper, synthetic paper, and the like can be used as the recording medium 5. Further, the recording medium 5 is not limited to such paper. For example, a fabric, polyethylene terephthalate (PET), polypropylene (PP), and the like can be used as the recording medium 5. Further, the recording medium 5 is not limited to a long paper sheet wound in a rolled state, and may be a cut paper sheet cut in advance.

Basic Configuration of Recording Controller

The recording controller 110 includes a printer controller 111, an input unit 112, a display unit 113, a storage unit 114, and the like, and controls a recording job to cause the printer 100 to perform recording. The recording controller 110 is configured using a personal computer as a preferred example.

Software by which the recording controller 110 operates includes general image processing application software (hereinafter, referred to as an application) that handles image data to be recorded and printer driver software (hereinafter, referred to as a printer driver) that generates recording data for executing control of the printer 100 and recording by the printer 100.

That is, the recording controller 110 generates recording data for causing the printer 100 to record the recording image based on the image data.

The printer driver is not limited to an example configured as a function unit of software, and may be configured by firmware. The firmware is mounted on, for example, a system on chip (SOC) in the recording controller 110.

The printer controller 111 includes a CPU 115, an ASIC 116, a DSP 117, a memory 118, a printer interface unit (I/F) 119, and the like, and performs centralized management of the entire recording system 1.

The input unit 112 is an information input unit as a human interface. In detail, examples of the input unit 112 include a keyboard, a mouse pointer, and a port to which an information input device is connected.

The display unit 113, which is an information display unit (a display) as a human interface, displays information input from the input unit 112, an image recorded by the printer 100, information related to a recording job, and the like, based on a control of the printer controller 111.

The storage unit 114, which is a rewritable storage medium such as a hard disk drive (HDD) and a memory card, stores software (a program operated by the printer controller 111) by which the recording controller 110 operates, a recorded image, information related to the recording job, and the like.

The memory 118 is a storage medium for securing an area for storing a program by which the CPU 115 operates, a working area for operation, and the like, and is configured with a storage element such as a random-access memory (RAM) and an electrically erasable and programmable read only memory (EEPROM).

Basic Configuration of Printer 100

The printer 100 includes a recording unit 10, a movement unit 20, a controller 30, and the like. The printer 100 that receives the recording data from the recording controller 110 causes the controller 30 to control the recording unit 10 and the movement unit 20 based on the recording data, and records an image (forms an image) on the recording medium 5.

The recording data is image forming data obtained by converting the image data such that the printer 100 can record the image data by the application included in the recording controller 110 and the printer driver, and includes a command for controlling the printer 100.

The image data includes, for example, general color image information (RGB data, and the like) obtained by a digital camera or the like, text information, and the like.

The recording unit 10 is configured with a head unit 11, an ink supply unit 12, and the like.

The movement unit 20 is configured with a main scanning unit 40, a transport unit 50, and the like. The main scanning unit 40 is configured with a carriage 41, a guide shaft 42, a carriage motor (not shown), and the like. The transport unit 50 is configured with a supply unit 51, a storage unit 52, a transport roller 53, a platen 55, and the like.

The head unit 11 includes a recording head 13 having a plurality of nozzles (a nozzle group) for discharging ink as ink droplets and a head controller 14. The head unit 11 is mounted on the carriage 41 and reciprocates in the main scanning direction along with the carriage 41 moving in the main scanning direction (an X-axis direction shown in FIG. 1). While moving in the main scanning direction, the head unit 11 (the recording head 13) discharges ink droplets to the recording medium 5 supported on the platen 55 under a control of the controller 30, so that a row of dots (a raster line) along the main scanning direction is formed on the recording medium 5.

The ink supply unit 12 includes an ink tank and an ink supply path (not shown) for supplying ink from the ink tank to the recording head 13.

In the ink, there is, as an ink set including, for example, a dark ink composition, a four-color ink set and the like obtained by adding black K to a three-color ink set of cyan C, magenta M, and yellow Y. Further, there is, for example, an eight-color ink set obtained by adding ink sets such as light cyan (Lc), light magenta (Lm), light yellow (Ly), and light black (Lk), which are light ink compositions, the concentration of which is reduced. The ink tank, the ink supply path, and an ink supply passage to a nozzle for discharging the same ink are provided independently for each ink.

A piezo method is used as a method (an ink jet method) for discharging ink droplets. The piezo method is a method in which a pressure corresponding to a recording information signal is applied to ink stored in a compression chamber by a piezoelectric element (a piezo element), ink droplets are ejected (discharged) from a nozzle communicating with the compression chamber, and thus recording is performed.

The method of discharging ink droplets is not limited thereto, and may be another recording method in which the ink is ejected in the form of droplets to form a dot group on the recording medium. Examples of the method may include a method in which the ink is continuously ejected in the form of droplets from the nozzle by a strong electric field between the nozzle and an acceleration electrode placed in front of the nozzle, and while the ink droplets fly, a recording information signal is given from a deflection electrode, so that recording is performed, a method (an electrostatic suction method) in which the ink droplets are ejected to correspond to the recording information signal without deflection, a method in which a pressure is applied to the ink with a small pump to cause the nozzle to mechanically vibrate with a quartz oscillator or the like so as to forcibly eject the ink droplets, and a method (a thermal jet method) in which the ink is heated and foamed in a micro electrode according to the recording information signal, and the ink droplets are discharged, so the recording is performed.

The movement unit 20 (the main scanning unit 40 and the transport unit 50) relatively moves the head unit 11 (the recording head 13) and the recording medium 5 under the control of the controller 30.

The guide shaft 42 extends in the main scanning direction and supports the carriage 41 in a slidable manner. Further, the carriage motor serves as a driving source when the carriage 41 reciprocates along the guide shaft 42. That is, the main scanning unit 40 (the carriage 41, the guide shaft 42, and the carriage motor) moves the carriage 41 (that is, the recording head 13) along the guide shaft 42 in the main scanning direction under the control of the controller 30.

The supply unit 51 rotatably supports a reel on which the recording medium 5 is wound in a roll shape, and sends the recording medium 5 to a transport passage. The storage unit 52 rotatably supports the reel on which the recording medium 5 is wound, and winds up the recording medium 5 for which recording has been completed from the transport passage.

The transport roller 53 includes a driving roller that moves the recording medium 5 in a sub scanning direction (a Y-axis direction shown in FIG. 1) intersecting the main scanning direction, a driven roller that rotates according to the movement of the recording medium 5, and the like. The transport roller 53 constitutes the transport passage through which the recording medium 5 is transported from the supply unit 51 via a recording area (an area where the recording head 13 moves on an upper surface of the platen 55 in the main scanning direction) of the recording unit 10 to the storage unit 52.

The controller 30 includes an interface unit (I/F) 31, a CPU 32, a memory 33, a driving controller 34, and the like, and controls the printer 100.

The interface unit 31 is connected to the printer interface unit 119 of the recording controller 110, and transmits and receives data between the recording controller 110 and the printer 100. The recording controller 110 and the printer 100 may be directly connected to each other through a cable and the like or may be indirectly connected to each other through a network and the like. Further, the data may be transmitted and received between the recording controller 110 and the printer 100 through wireless communication.

The CPU 32 is an arithmetic processing unit for controlling the entire printer 100.

The memory 33 is a storage medium for securing an area for storing a program by which the CPU 32 operates, a working area for operation, and the like, and is configured with a storage element such as a RAM and an EEPROM.

The CPU 32 controls the recording unit 10 and the movement unit 20 via the driving controller 34 according to the program stored in the memory 33 and the recording data received from the recording controller 110.

The driving controller 34 controls driving of the recording unit 10 (the head unit 11 and the ink supply unit 12) and the movement unit 20 (the main scanning unit 40 and the transport unit 50) based on a control of the CPU 32. The driving controller 34 includes a movement control signal generating circuit 35, a discharge control signal generating circuit 36, and a driving signal generating circuit 37.

The movement control signal generating circuit 35 is a circuit that generates a signal for controlling the movement unit 20 (the main scanning unit 40 and the transport unit 50) in accordance with an instruction from the CPU 32.

The discharge control signal generating circuit 36 generates a head control signal for selecting a nozzle for discharging the ink, selecting a discharge amount, controlling a discharge timing, and the like, according to the instruction from the CPU 32 based on the recording data.

The driving signal generating circuit 37 is a circuit that generates a basic driving signal including a driving signal for driving the piezoelectric element of the recording head 13.

The driving controller 34 selectively drives the piezoelectric element corresponding to the nozzle based on the head control signal and the basic control signal.

Nozzle Row (Recording Head)

Figure 3:
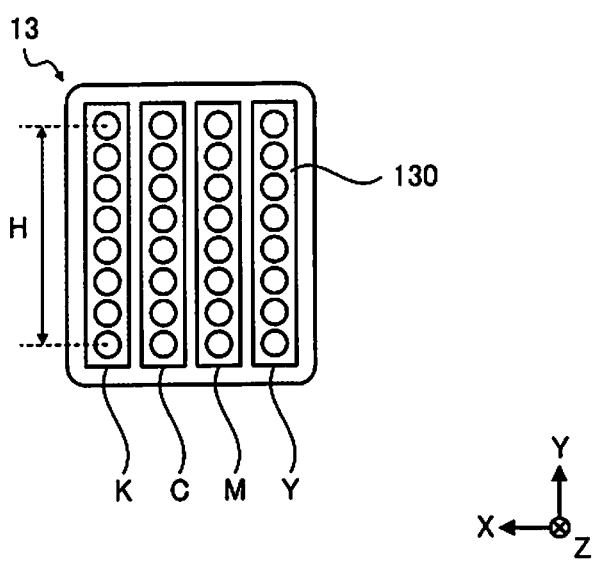
FIG. 3 is a schematic view showing an example of arrangement of a nozzle when viewed from a lower surface of a recording head.

FIG. 3 is a schematic view showing an example of arrangement of a nozzle when viewed from a lower surface of a recording head 13.

As illustrated in FIG. 3, the recording head 13 includes four nozzle rows 130 (a black ink nozzle row K, a cyan ink nozzle row C, a magenta ink nozzle row M, and a yellow ink nozzle row Y) as a "nozzle group", which are formed by arranging a plurality of nozzles for discharging inks having different colors. The nozzle rows 130 are arranged in parallel to each other at regular intervals along a direction (the X-axis direction) intersecting the sub scanning direction.

As described above, the controller 30 repeatedly performs a pass operation in which while the carriage 41 supporting the recording head 13 along the guide shaft 42 moves in the main scanning direction (the X-axis direction), the ink droplets are discharged (given) from the recording head 13 to the recording medium 5 supplied to the recording area by the transport unit 50 (the supply unit 51 and the transport roller 53) and a transport operation (a feeding operation) in which the recording medium 5 moves in the sub scanning direction (the +Y direction) intersecting the main scanning direction by the transport unit 50 (the transport roller 53). Thus, the controller 30 forms (records) a desired image on the recording medium 5.

Basic Function of Printer Driver in Related Art

Figure 4:
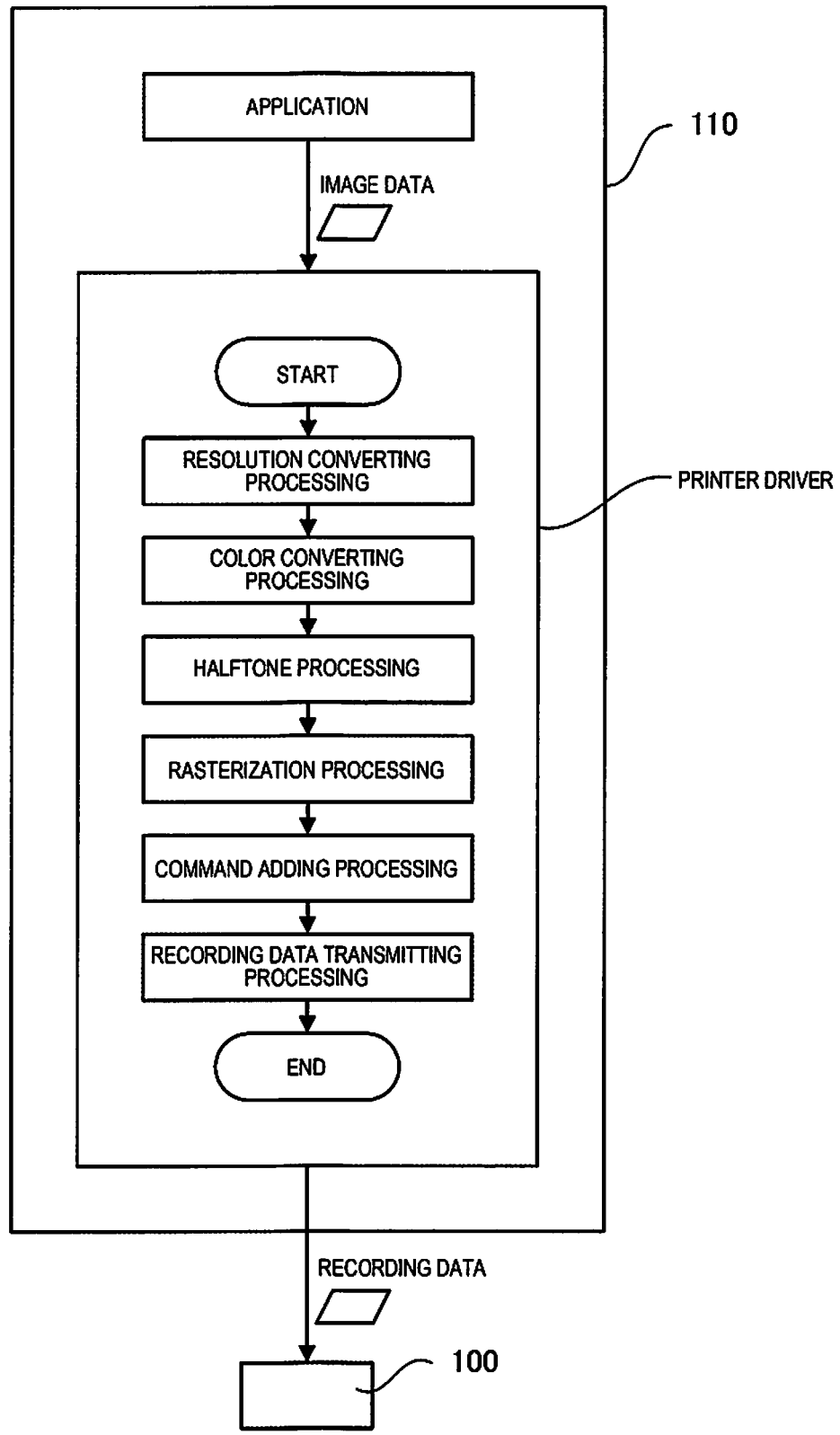
FIG. 4 is a diagram for illustrating a basic function of a printer driver according to the related art.

FIG. 4 is a diagram for illustrating a basic function of a printer driver according to the related art.

The recording on the recording medium 5 starts by transmitting the recording data from the recording controller 110 to the printer 100. The recording data is generated by the printer driver.

Hereinafter, a step of generating the recording data according to the related art will be described with reference to FIG. 4.

The printer driver receives the image data from the application, converts the image data into the recording data in a form that can be interpreted by the printer 100, and outputs the recording data to the printer 100. When the image data from the application is converted into the recording data, the printer driver performs resolution converting processing, color converting processing, halftone processing, rasterization processing, command adding processing, and the like.

The resolution converting processing is processing of converting the image data output from the application into a resolution when the image data is recorded in the recording medium 5. For example, when the recording resolution is specified as 600×600 dpi, vector format image data received from the application is converted into bitmap format image data having a resolution of 600×600 dpi. Each pixel data of the image data after the resolution converting processing is configured with pixels arranged in a matrix. Each pixel has a gradation value of, for example, 256 gradations in an RGB color space. That is, the pixel data after the resolution converting processing indicates a gradation value of the corresponding pixel.

Among the pixels arranged in a matrix, pixel data corresponding to pixels in one column aligned in a predetermined direction is referred to as raster data. The predetermined direction in which the pixels corresponding to the raster data are aligned corresponds to a movement direction (the main scanning direction) of the recording head 13 when an image is recorded.

The color converting processing is processing of converting the RGB data into data of a CMYK color system space. The CMYK colors include cyan C, magenta M, yellow Y, and black K, and the image data of the CMYK color system space is data corresponding to the color of the ink that the printer 100 has. Thus, for example, when the printer 100 uses 10 kinds of inks of the CMYK color system, the printer driver generates image data of a 10-dimensional space of the CMYK color system based on the RGB data.

The color converting processing is performed based on a table (a color conversion lookup table LUT) in which gradation values of RGB data are associated with gradation values of CMYK color system data. The pixel data after the color converting processing is, for example, CMYK color system data having 256 gradations represented by the CMYK color system space.

The halftone processing is processing of converting data having a high gradation number (256 gradations) into data having a gradation number that can be formed in the printer 100. By the halftone processing, data indicating 256 gradations is converted into halftone data, which determines a formation state of dots, such as 1-bit data indicating two gradations (with a dot and without a dot) and 2-bit data indicating four gradations (without a dot, a small dot, a medium dot, and a large dot). In detail, from a dot generation rate table in which gradation values (0-255) are associated with dot generation rates, the dot generation rates (for example, in the case of the four gradations, dot generation rates with no dot, with a small dot, with a medium dot, and with a large dot) corresponding to the gradation values are obtained. In the obtained dot generation rates, pixel data is generated such that dots are dispersed and formed using a dither method, an error diffusion method, or the like. In this way, in the halftone processing, halftone data is generated which determines a formation state of a dot formed by a nozzle group that discharges an ink having the same color.

The rasterization processing is processing of rearranging pixel data arranged in a matrix (for example, 1-bit or 2-bit halftone data as described above) in a dot formation order at a time of recording. The rasterization processing includes allocation processing in which the image data configured with the pixel data (the halftone data) after the halftone processing is allocated to the pass operation in which the ink droplets are discharged while the recording head 13 (the nozzle row 130) moves in the main scanning direction. When the allocation step is completed, the pixel data arranged in a matrix is allocated to an actual nozzle forming a raster line constituting a recording image, in the pass operation.

The command adding processing is processing of adding command data according to a recording method to rasterization data. The command data includes, for example, transport data related to a transport specification (a movement amount, a velocity, and the like in the sub scanning direction) of the recording medium 5.

The processing by the printer driver is performed by the ASIC 116 and the DSP 117 (see FIG. 2) under the control of the CPU 115, and the generated recording data is transmitted to the printer 100 through the printer interface unit 119 by recording data transmission processing.

Image Data Including Code Information

Figure 5:
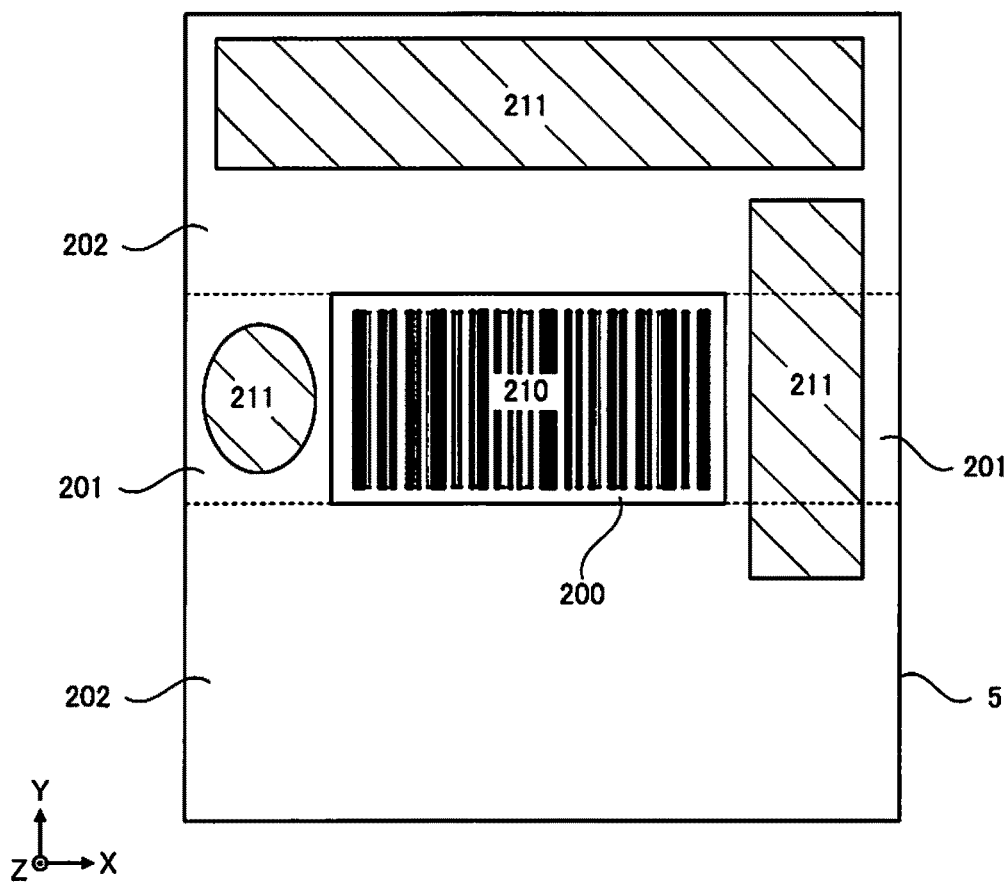
FIG. 5 is a schematic view showing an example of image data including code information.

FIG. 5 shows an example of the image data including the code information.

The image data is configured with code information 210 and various other objects 211 such as characters, pictures, and graphs. The code information includes not only a barcode (one-dimensional code) as illustrated, but also a two-dimensional code. Further, an area including the code information 210 is defined as an area 200 (a first area), an area adjacent to the area 200 including the code information in the main scanning direction is defined as an area 201 (a second area), and an area adjacent to the area 200 or the area 201 in the sub scanning direction is defined as an area 202 (a third area).

Recording of Image Including Code Information in Related Art

Figure 6:
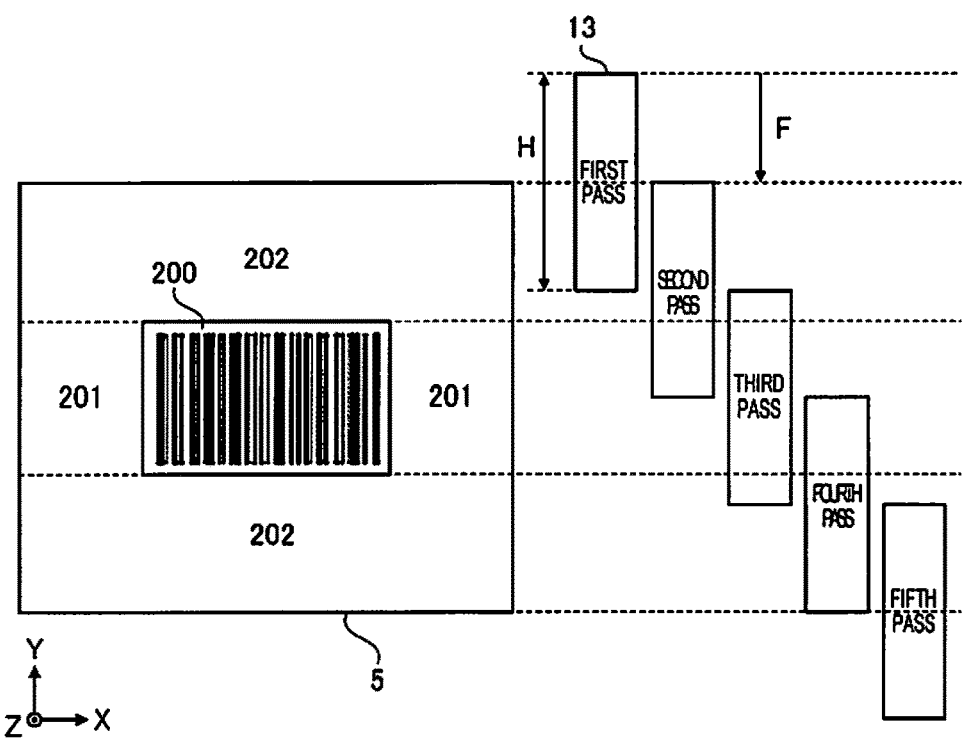
FIG. 6 is a schematic view showing an example of a recording operation by a serial-type ink jet printer.

FIG. 6 shows an example of a recording operation by a serial-type ink jet printer.

Here, for convenience of illustration, a state in which the recording head 13 moves in the sub scanning direction with respect to the recording medium 5 is shown. In this example, the pass operation is recorded in the recording medium 5 five times, and a movement amount F of the recording head is a half of a head length H (see FIG. 3). The area 200 including the code information is recorded by a total of three pass operations of a second pass, a third pass, and a fourth pass.

The path operation may be simply expressed as a "pass", but has the same meaning as a "pass operation". Further, the recording head 13 may be simply expressed as a "head", which has the same meaning as the "recording head 13".

Figure 7:
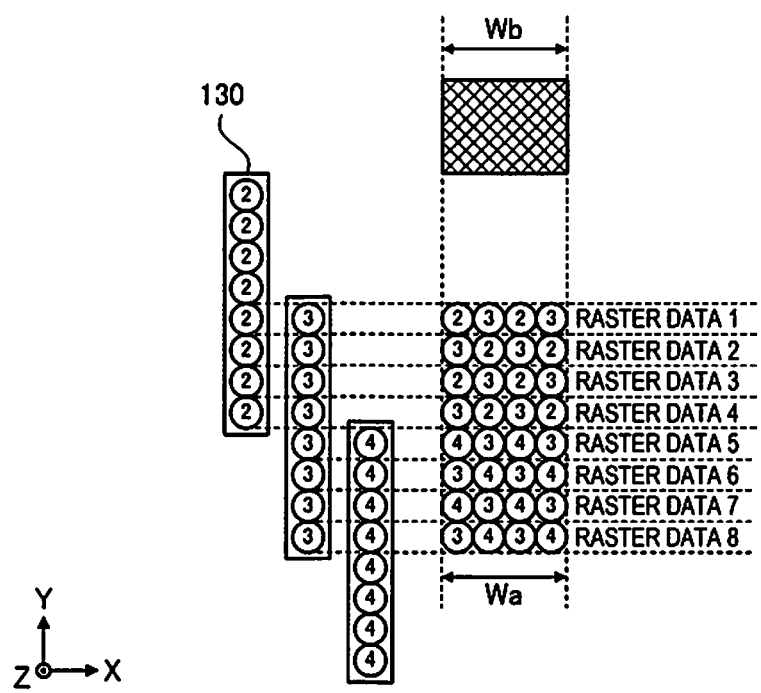
FIG. 7 is a schematic view showing a positional relationship between a nozzle for recording an area including the code information and a dot on a recording medium in the recording operation of FIG. 6.

FIG. 7 shows a positional relationship between a nozzle for recording an area 200 including the code information and a dot on a recording medium 5 in the recording operation of FIG. 6.

Here, one nozzle 130 is shown as an example. Further, for convenience of illustration, a position in the main scanning direction in each pass operation is described in a shifted manner.

Focusing on a dot row (a raster line) along the main scanning direction, one raster line is recorded by two pass operations by thinning every other dot formed in each pass operation. In this example, an example is shown where a simple pattern in which every other dot is thinned out is used. However, in practice, for example, a dither pattern having noise characteristics is used.

A bar width Wb is the width of the bar to be recorded, and a bar width Wa is the width of the bar actually formed on the recording medium 5 as a result of the recording operation. As Wa is closer to Wb, the bar width can be accurately recorded, resulting in a high quality code.

Figure 8:
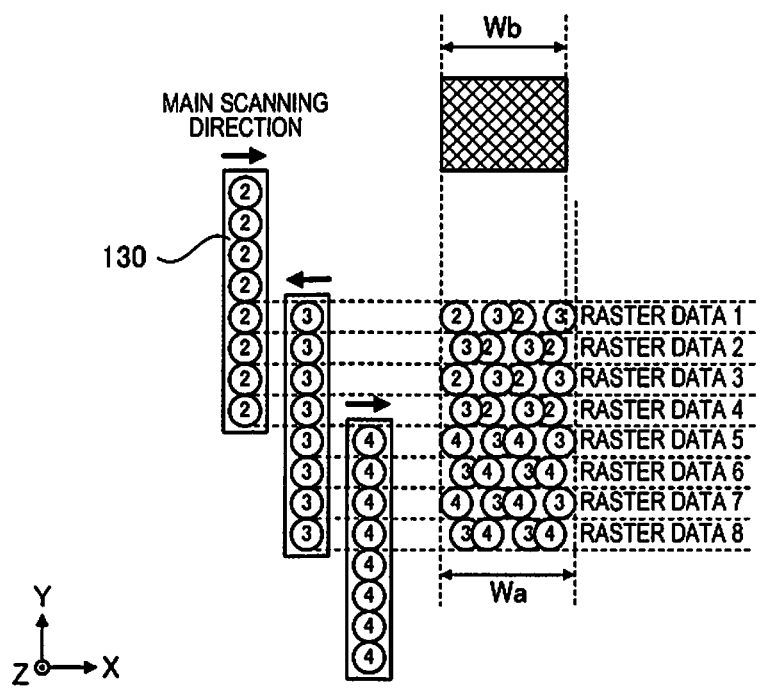
FIG. 8 is a schematic view showing a positional relationship between dots when there is deviation between an impact position of a dot discharged in a forward direction and an impact position of a dot discharged in a rearward direction if the recording operation of FIG. 6 is performed by bidirectional scanning.

FIG. 8 shows a case where the recording operation of FIG. 6 is performed by bidirectional scanning of the head, and the landing position of the dot discharged in the forward direction and the landing position of the dot discharged in the rearward direction deviate from each other.

In detail, since the scanning directions of the second pass and the fourth pass are the same, there is no deviation between the landing positions of the dots. However, a state is shown in which the landing position of the dot for the third pass having a different scanning direction of the head is shifted in the +X direction. In this way, due to a difference in the landing position of the dot generated due to a different in the scanning direction of the head, a difference between the bar widths Wb and Wa formed on the recording medium 5 increases, and code quality deteriorates.

Further, hereinafter, a pass operation for performing recording in bidirectional scanning of the head is expressed as bidirectional recording, and a pass operation for performing recording in unidirectional scanning of the head is expressed as unidirectional recording (unidirectional recording).

In contrast, from the related art, by detecting the code information included in the image data, a pass for recording the code information is specified. In the path for recording the code information, a technology is used to suppress the deterioration of code quality by switching the recording operation. Accordingly, the pass that does not recode the code information performs bidirectional recording, and the pass that records the code information performs unidirectional recording. Thus, in a state in which there is no landing deviation between dots due to the difference in the scanning direction of the head, the code information can be recorded.

However, there is another factor that causes the deviation between the landing positions of the dots. For example, there are factors such as a mounting error of the head, a transport error of the recording medium 5, and a cock ring of the recording medium 5. The mounting error of the head is, for example, is an error that occurs when the recording head 13 is assembled with the carriage 41, and indicates a state in which the nozzle row 130 is not parallel to the sub scanning direction. The transport error of the recording medium 5 indicates, for example, a state in which the recording medium 5 is not transported vertically to the nozzle row 130. Further, the cock ring of the recording medium 5 corresponds to, for example, generation of wrinkles in the recording medium 5 by contracting the recording medium 5 by applying the ink to the recording medium 5.

When there is such an error, if the recording is performed by the plurality of pass operations, the deviation occurs between the landing positions of the dots for the pass operations. Thus, the deviation between the landing positions of the dots, caused by such factors, cannot be suppressed in the above-described related art.

Further, as in the related art described above, the switching of the recording operation only for a specific pass affects an area not including the code information, for example, the area 201. That is, for example, when the same type of objects are recorded in the area 201 and the area 202, a difference occurs.

In detail, since the area 202 performs the bidirectional recording, the landing deviation between the dots occurs due to the scanning direction of the head. However, since the area 201 performs the unidirectional recording, the landing deviation between the dots does not occur due to the scanning direction of the head. The presence or absence (the magnitude) of the landing deviation between the dots is related to the size of the area in which the ink covers the recording medium 5. That is, in an area where the landing deviation between the dots is present (large) and an area where the landing deviation between the dots is not present (small), a difference in the area in which the ink covers the recording medium 5 occurs. Thus, a difference occurs in the color or the density of a printed matter, which causes image quality deterioration such as color unevenness.

Further, in the bidirectional recording and the unidirectional recording, times during which each pass is recorded are also different from each other. For example, in unidirectional printing, a head that has performed the recording while moving in the forward direction needs a time, during which the head moves in a return direction, to perform a next pass operation. However, in bidirectional printing, this time is not required. In this way, when there is a difference between times during which the recording is performed in the passes, a difference occurs between the behaviors of the inks when the inks discharged in different passes overlap with each other, for example, penetration speeds of the inks into the recording medium 5. For example, as the ink discharged in a previous pass is dried, penetration of an ink superimposed on the ink into the recording medium 5 in a next pass becomes shallower, and the color development tends to be improved. In this way, a difference between the times during which the recording is performed in the passes depending on the area causes the image quality deterioration such as the color unevenness.

Further, the present disclosure is not limited to the above-described switching of the head in the scanning direction, and is also applied to switching of the number of passes depending on the area. A difference when the same object is recorded on the area 201 and the area 202 occurs, which causes the image quality deterioration.

Figure 9:
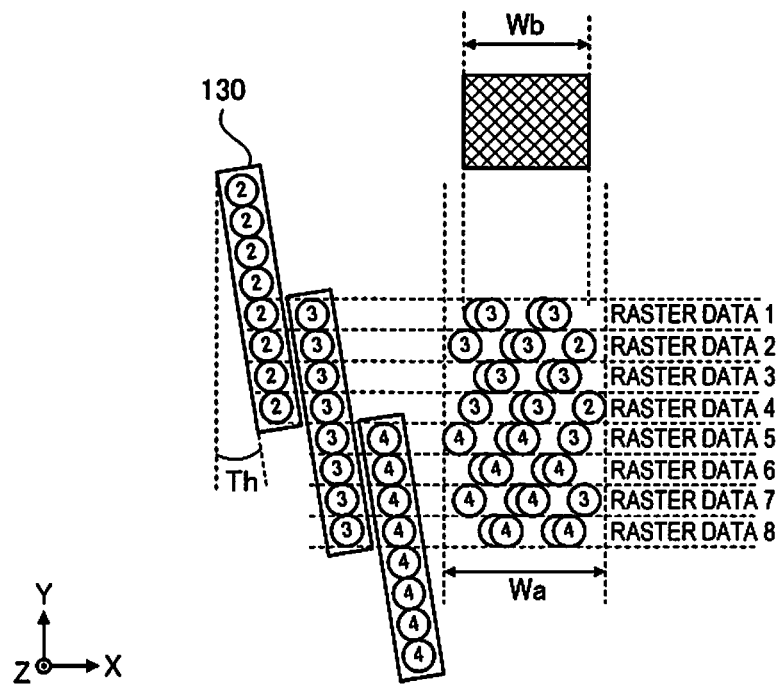
FIG. 9 is a schematic view showing a positional relationship between dots when a nozzle row is inclined and attached by an inclination with respect to a sub scanning direction.

FIG. 9 shows the recording of the code information when the nozzle row 130 is inclined and mounted by an inclination Th with respect to the sub scanning direction.

In this case, even when there is no landing deviation between dots caused by a difference of the scanning direction of the head, that is, even when the recording is performed only by unidirectional scanning of the head, the bar width Wa of the bar formed on the recording medium 5 becomes larger than the bar width Wb, and thus the code quality deteriorates. Further, shaking of an outline of the bar or generation of a portion where there is no dot (a portion where a paper sheet is viewed) causes a reduction in the concentration of the bar, which leads to deterioration of the code quality.

Here, although a case has been shown in which the nozzle row 130 is inclined with respect to the transport direction (the sub scanning direction) of the recording medium 5, the same is even applied to a case where the recording medium 5 is transported with an inclination with respect to the nozzle row 130.

The deterioration of the code quality as shown in FIG. 9 occurs when there is an error in a relative positional relationship between the transport direction of the recording medium 5 and the nozzle row 130. That is, it can be mentioned that the error is generated by recording the code information in a plurality of pass operations. Thus, for example, when the code information is completely recorded only by one pass operation, the effects by these errors can be eliminated.

Meanwhile, in the serial type ink jet printer, by increasing the number of passes, the amount of ink applied to the recording medium 5 once is reduced. By making the penetration of the ink into the recording medium 5 shallow, a large amount of coloring materials stays near the surface of the recording medium 5, thereby enhancing the color development. Further, the resolution can be increased by increasing the number of passes. Since the size of the ink droplets can be reduced, graininess can also be improved.

In this way, it is necessary to increase the number of passes to improve printing quality such as the color development and the graininess. However, in order to improve quality of the code information, it is necessary to reduce the number of passes. In the related art, these conflicting requirements cannot be achieved simultaneously.

Here, the recording system 1 according to the present embodiment includes a code detecting unit that detects the area 200 (a first area) where the code information 210 included in the image data is located and a recording controller 110 that controls the pass operation and the transport operation based on the image data and a result of the detection by the code detecting unit. The recording controller 110 controls the number of the pass operations for recording the area 200 to be smaller than the number of times of the pass operations for recording the area 201 (a second area) adjacent to the area 200 in the main scanning direction.

Hereinafter, detailed Examples will be described.

Detection of Code Information

In order to solve the above-described problem, first, it is necessary to detect the code information in the image data and specify the area 200 including the code information. In the present embodiment, there are various methods of detecting code information, which can be adopted. For example, in a bitmap format image data after resolution converting processing, detection of a specific pattern (a pattern in which a black region and a white region having a predetermined width or more repeatedly appear in a predetermined direction) is attempted, so that the corresponding specific pattern, that is, the code information, is detected, and the area 200 including the code information is specified. In this case, the code detecting unit is configured with, for example, an image processing function unit that detects the specific pattern in the printer driver.

Otherwise, designation of the area of the code information by a user may be accepted. In detail, the display unit 113 displays the bitmap format image data after resolution converting processing. When the user recognizes the presence of the code information in the image data displayed on the display unit 113, the input unit 112 is operated to designate a range in which the code information exists by surrounding the range in a rectangle or the like. The range designated by the user is specified as the area 200 including the code information. In this case, the code detecting unit is configured with, for example, the recording controller 110 that performs processing of receiving the designation by the user.

Otherwise, the code information may be detected by analyzing the image data before the resolution converting processing and extracting specific information indicating the presence of the code information. The specific information indicating the presence of the code information is, for example, a so-called barcode font. The presence of the code information, that is, the code information in the image data can be detected based on the barcode font embedded in the image data. In this case, the code detecting unit, for example, the recording controller 110, is configured with a software function unit that searches for information embedded in the image data.

Example 1

Figure 10:
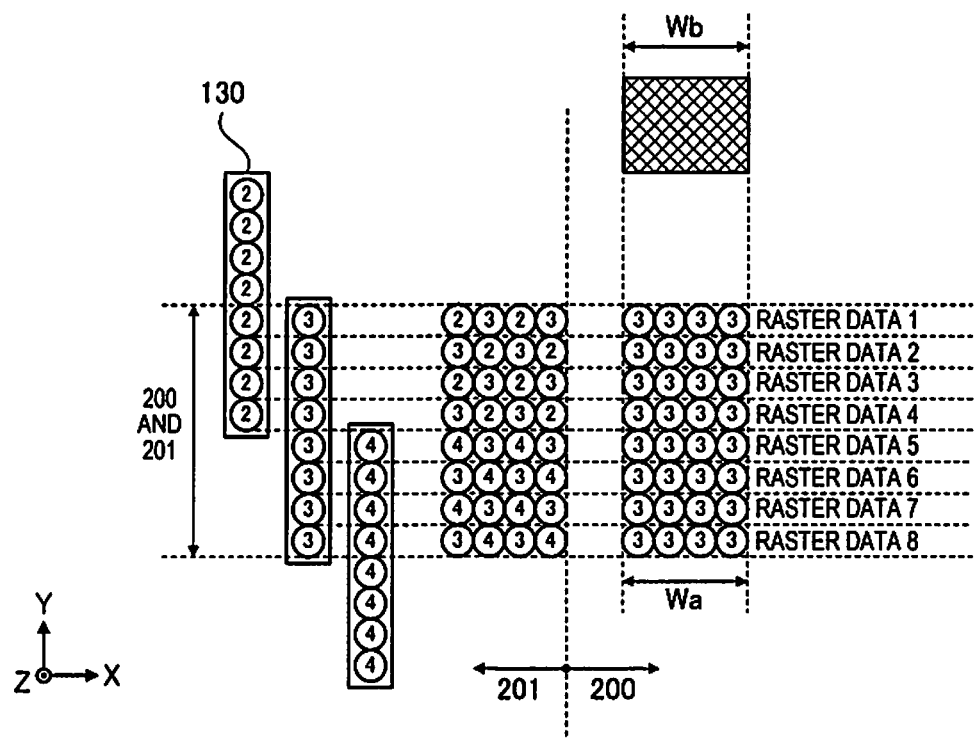
FIG. 10 is a schematic view showing a positional relationship between the nozzle for recording the area including the code information and an area adjacent to the area including the code information in the main scanning direction and the dot on the recording medium according to Example 1.

FIG. 10 shows a positional relationship between a nozzle for recording the area 200 and the area 201 and a dot on the recording medium 5 according to Example 1.

In the present Example, the positional relationship between the nozzle row 130 and the recording medium 5 and the pass operation of moving the nozzle row 130 in the main scanning direction and the transport direction of moving the recording medium 5 are the same as those shown in FIGS. 6 and 7. Thus, the operation of recording the area 201 is the same as a case where the present disclosure is not applied, and the recording is performed by three pass operations. Further, the operation is the same as an operation of recording the area 202 adjacent to the area 201 in the sub scanning direction.

Meanwhile, the area 200 including the code information specified by the above-described method of detecting the code information is recorded only by one pass operation (the third pass) without dot thinning.

According to the recording operation of the present Example shown in FIG. 10, it is possible to record the area 200 including the code information without influence of the deviation between the landing positions of the dots. For example, even when there is the landing deviation of the dots caused by the scanning direction of the head as illustrated in FIG. 8, the bar width Wa does not become large. Further, as shown in FIG. 9, when the head is inclined and attached, the bar is formed to be inclined as a whole. However, since the width of the bar is not thickened, quality of the code information does not deteriorate.

Further, in the area 201, the recording operation is the same when the present disclosure is not applied. Improvement in the color development, the graininess, and the like can be realized by performing recording in a plurality of pass operations. Further, since the recording operation of the area 201 is the same as the recording operation of the area 202, the image quality deterioration such as the color unevenness does not occur.

In this way, while the area 200 (the first area) is recorded by one pass operation, in an operation of recording the area 201 and the area 202, specifically, the number of times of the pass operation and the main scanning direction (the unidirectional recording or the bidirectional recording) are controlled in the same manner, so that both the quality of the code information and the printing quality can be achieved.

That is, in the present Example, the recording controller 110 controls to record at least apart of the area 200 (the first area) in one pass operation.

Further, in the present Example, the recording controller 110 controls such that the number of times of the pass operation of recording the area 202 (the third area) adjacent to the area 200 or the area 201 in the sub scanning direction is equal to the number of times of the pass operation of recording the area 201.

Example 2

Figure 11:
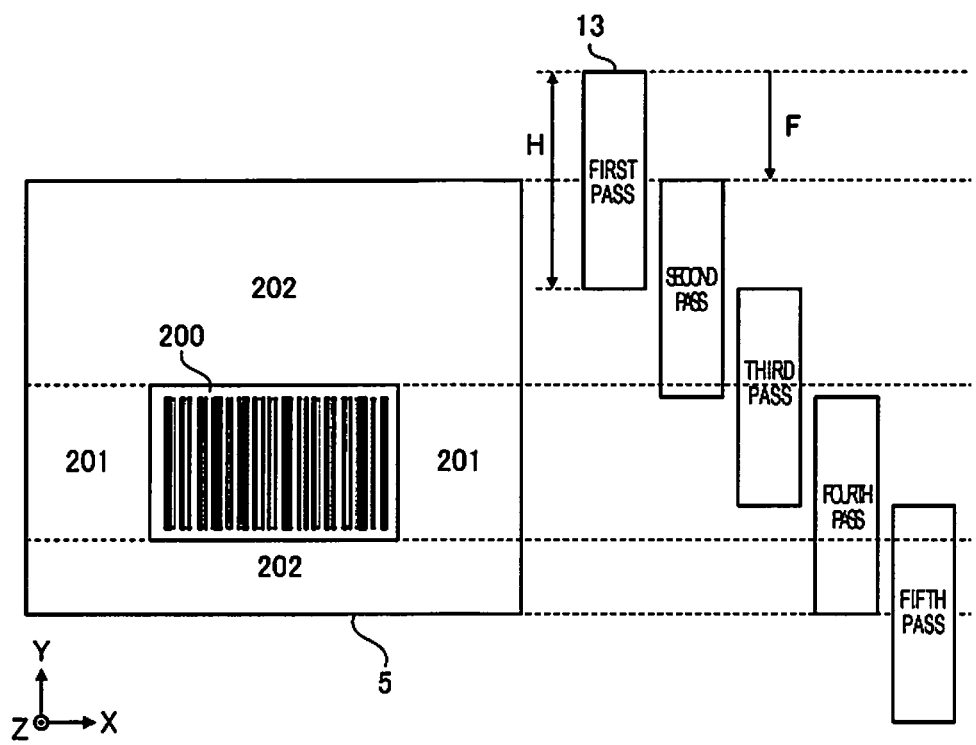
FIG. 11 is a schematic view showing a positional relationship between the recording head, the recording medium, and the area including the code information according to Example 2.

FIG. 11 shows a positional relationship between the recording head 13, the recording medium 5, and the area 200 according to Example 2.

The size of the recording medium 5, the size of the area 200 including the code information, and the positional relationship between the recording head 13 and the recording medium 5 are all the same as those of FIG. 6. However, the positions of the area 200 and the area 201 adjacent to the area 200 in the sub scanning direction are different from those of FIG. 6.

In this way, depending on the positional relationship between the area 200 and the recording head 13, the entire area 200 may not be recorded in one pass. Alternatively, even when the area 200 is larger than the head length H, the entire area 200 cannot be recorded in one pass.

Figure 12:
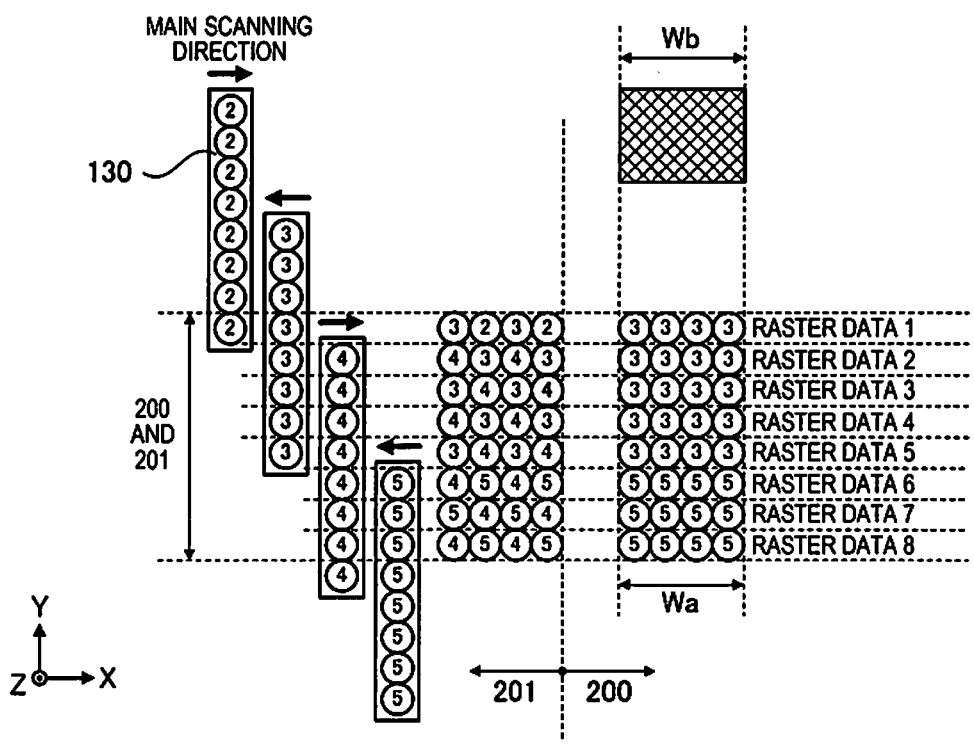
FIG. 12 is a schematic view showing a positional relationship between the nozzle for recording the area including the code information and the area adjacent to the area including the code information in the main scanning direction and the dot on the recording medium, which corresponds to FIG. 11.

FIG. 12 shows a positional relationship between a nozzle for recording the area 200 and the area 201 and a dot on the recording medium 5, to correspond to FIG. 11.

Similar to Example 1, the operation of recording the area 201 is the same as a case where the present disclosure is not applied, and the recording is performed by four pass operations. Further, the operation of recording the area 202 is the same.

Meanwhile, in the area 200, the recording is performed by two pass operations of the third pass and the fifth pass in the same main scanning direction. Similar to Example 1, each raster line is recorded by only one pass operation (the third pass or the fifth pass) without dot thinning. In other words, the area 200 is divided into two areas corresponding to raster data 1 to 5 and raster data 6 to 8, and the divided areas are recorded by one pass operation.

According to the present Example shown in FIG. 12, it is possible to reduce the influence of the deviation between the landing positions of the dots on the area 200 including code information. For example, even when there is the landing deviation of the dots due to the scanning direction of the head, the scanning directions of the third pass and the fifth pass for recording the area 200 are the same. Thus, the bar width Wa does not increase, and the quality of the code information does not deteriorate. Further, even when the head is inclined and attached, when areas corresponding to the raster data 1 to 5 and the raster data 6 to 8 are viewed, there is no thickening of the bar width Wa. The landing deviation of the dots may occur only at a boundary between the raster data 5 and 6. However, for example, when the code information is read in one dimension like a barcode, it is difficult to lead to the deterioration of the code quality.

In this way, even when the entire area 200 including the code information cannot be recorded by one pass operation, at least a part of the area is recorded by one pass operation, so that the deterioration of the quality of the code information can be suppressed. Further, a pass is selected such that the pass operation for recording the area 200 is performed in the same main scanning direction, so that it is possible to eliminate the influence of the landing deviation of the dots caused by the difference in the scanning direction of the head. Further, in the area 201, since the area 202 and the recording operation, specifically, the number of times of the pass operation and the main scanning direction (the unidirectional recording or the bidirectional recording) are the same, the image quality deterioration such as the color unevenness does not occur. Thus, according to the present Example, both the quality of the code information and the printing quality can be achieved.

That is, in the present Example, the recording controller 110 controls to record at least a part of the area 200 (the first area) in one pass operation.

That is, in the present Example, when the recording controller 110 cannot record the area 200 (the first area) in one pass operation, the area 200 is recorded by the first pass operation (the pass operation of the third pass in an example shown in FIG. 12) and the second pass operation (the pass operation of the fifth pass in the example shown in FIG. 12) after the first pass operation, the first pass operation and the second pass operation are controlled to be performed in the same main scanning direction.

Example 3

Figure 13:
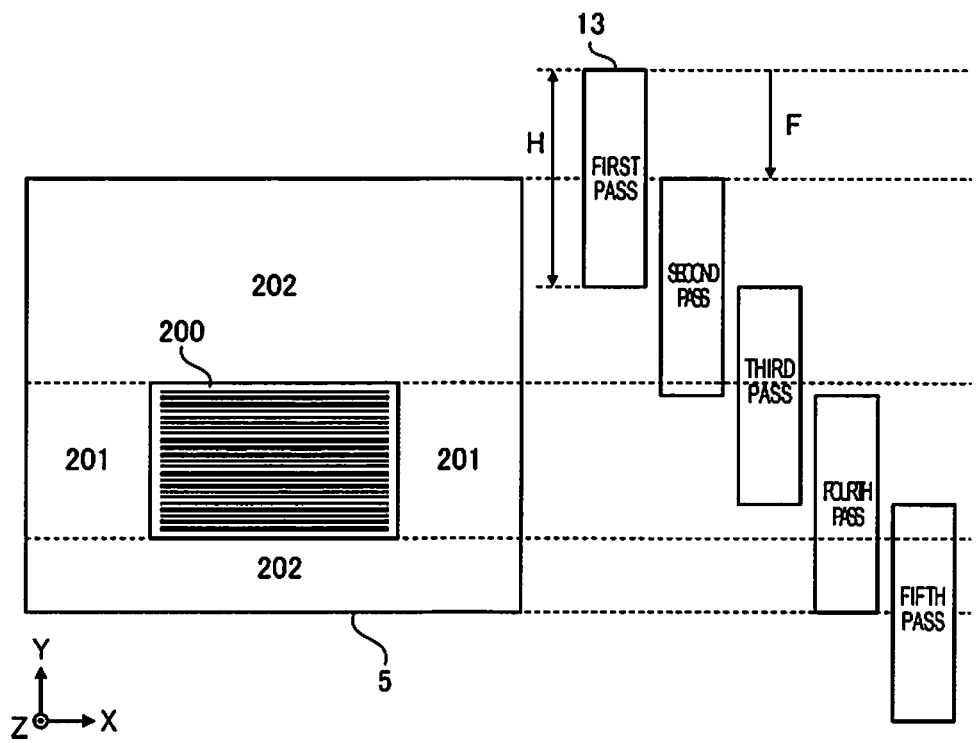
FIG. 13 is a schematic view showing a positional relationship between the recording head, the recording medium, and the area including the code information according to Example 3.

FIG. 13 shows a positional relationship between the recording head 13, the recording medium 5, and the area 200 according to Example 3.

The size of the recording medium 5, the size and the position of the area 200 including the code information, and the positional relationship between the recording head 13 and the recording medium 5 are all the same as those of FIG. 11. However, the code information included in the area 200 is disposed to be rotated by 90 degrees from FIG. 11.

Figure 14:
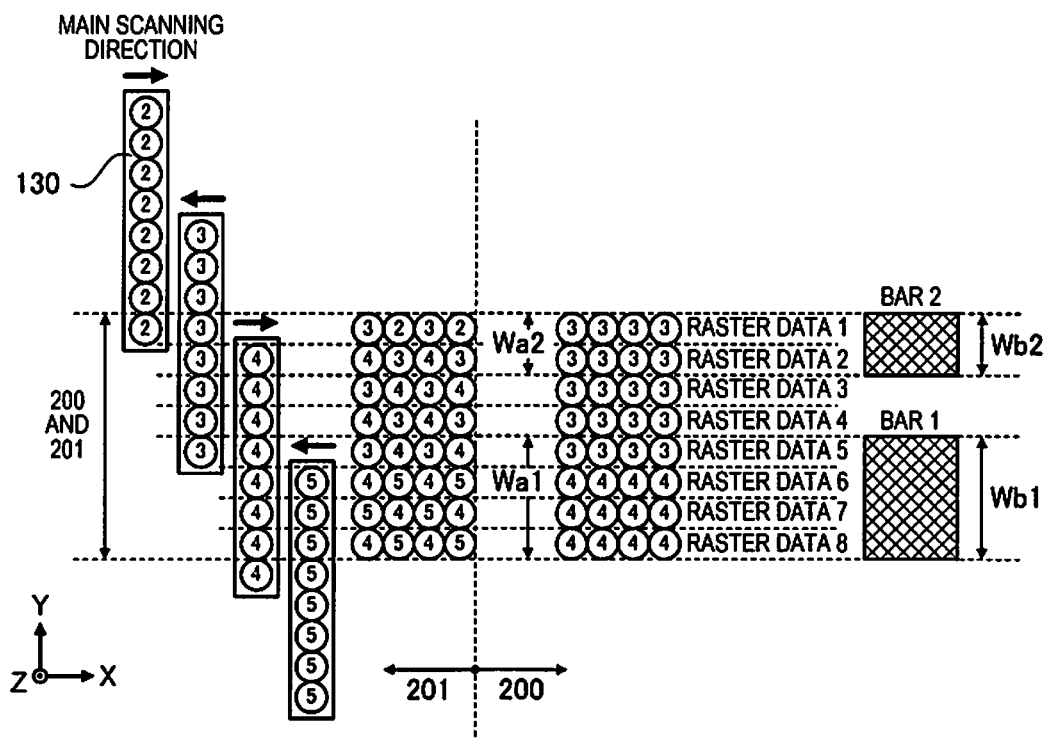
FIG. 14 is a schematic view showing a positional relationship between the nozzle for recording the area including the code information and the area adjacent to the area including the code information in the main scanning direction and the dot on the recording medium, which corresponds to FIG. 13.

FIG. 14 shows a positional relationship between a nozzle for recording the area 200 and the area 201 and a dot on the recording medium 5, to correspond to FIG. 13.

Similar to Example 1, the operation of recording the area 201 is the same as a case where the present disclosure is not applied, and the recording is performed by four pass operations. Further, the operation of recording the area 202 is the same.

Meanwhile, in the area 200, the recording is performed by two pass operations of the third pass and the fourth pass in different main scanning directions. Similar to Example 1, each raster line is recorded by only one pass operation (the third pass or the fourth pass) without dot thinning. In other words, the area 200 is divided into two areas corresponding to raster data 1 to 5 and raster data 6 to 8, and the divided areas are recorded by one pass operation.

According to the present Example shown in FIG. 14, it is possible to reduce the influence of the deviation between the landing positions of the dots on the area 200 including code information. For example, when an error in the transport distance of the recording medium 5 exists due to a variation in the diameter of the transport roller 53 or the like, the error is accumulated and increased as the transport operation is repeated. Here, when the present disclosure is not applied (in the same case as the area 201), the bar width Wa1 is recorded by three pass operations, and thus, an error corresponding to two transport operations is reflected. Meanwhile, when the present disclosure is applied, the bar width Wa1 is recorded by two pass operations, and thus, an error corresponding to only one transport operation is reflected. Further, depending on the position of the bar, it is also possible to perform the recording without being affected by the error caused by the transport operation. For example, since the bar 2 of FIG. 14 is recorded by one pass operation, even when there is the error caused by the transport operation, the bar width Wa2 is not changed.

In this way, even when the entire area 200 including the code information cannot be recorded by one pass operation, at least a part of the area is recorded by one pass operation, so that the deterioration of the quality of the code information can be suppressed. Further, as the pass is selected such that the pass operation of recording the area 200 is performed in a different main scanning direction, it is possible to reduce the influence of the deviation between the landing positions of the dots caused by the error of the transport direction of the recording medium 5. Further, in the area 201, since the area 202 and the recording operation, specifically, the number of times of the pass operation and the main scanning direction (the unidirectional recording or the bidirectional recording) are the same, the image quality deterioration such as the color unevenness does not occur. Thus, according to the present Example, both the quality of the code information and the printing quality can be achieved.

That is, in the present Example, the recording controller 110 controls to record at least a part of the area 200 (the first area) in one pass operation.

That is, in the present Example, when the recording controller 110 cannot record the area 200 (the first area) in one pass operation, the area 200 is recorded by the first pass operation (the pass operation of the third pass in an example shown in FIG. 14) and the second pass operation (the pass operation of the fourth pass in the example shown in FIG. 14) after the first pass operation, the first pass operation and the second pass operation are controlled to be performed in different main scanning directions.

In Example 2 shown in FIGS. 11 and 12, and Example 3 shown in FIGS. 13 and 14, although the size of the recording medium 5, the size and the position of the area 200 including the code information, and the positional relationship between the recording head 13 and the recording medium 5 are all the same, the pass for recording the area 200 is different. In detail, In Example 2, the area 200 is recorded by two pass operations of the third pass and the fifth pass in the same main scanning direction. Meanwhile, in Example 3, the area 200 is recorded by two pass operations of the third pass and the fourth pass in different main scanning directions. In this way, when there are a plurality of options of the passes for recording the area 200, for example, the passes can be selected in the following manner.

When there are a plurality of options of the passes for recording the area 200, for example, the pass for recording the area 200 is selected according to a direction of the code information. The direction of the code information can be automatically detected by detecting the direction of the pattern in the above-described code detecting unit that detects the specific pattern (the pattern in which a black region and a white region having a predetermined width or more repeatedly appear in a predetermined direction). Otherwise, designation of the direction of the code information by the user may be accepted. Otherwise, the direction of the barcode font embedded in the image data may be detected. The pass for recording the area 200 is selected based on the direction of the code information detected by such a unit.

For example, in the case of a one-dimensional code, when a bar alignment direction corresponds to the main scanning direction (when the bar alignment direction corresponds to the direction of the code information shown in FIG. 11), a pass having the same main scanning direction is selected to suppress occurrence of thickening of the bar or rattling of the outline. Meanwhile, when the bar alignment direction corresponds to the sub scanning direction (when the bar alignment direction corresponds to the direction of the code information shown in FIG. 13), the number of times of the transport operation performed while the area 200 is recorded is reduced to suppress the occurrence of the thickening of the bar or the rattling of the outline due to the landing deviation of the dots caused by the transport operation of the recording medium 5.

When there are the plurality of options of the passes for recording the area 200, a pass is selected based on a difference between accuracies of the pass operation and the transport operation which the configuration of the printer 100 has. The difference between the accuracies may be measured in advance, for example, in a step of manufacturing the printer 100. Otherwise, designation by the user may be accepted. Otherwise, the magnitude of the error may be determined by a sensor provided in the printer 100, for example, a camera for capturing a printed matter, and the like. The pass for recording the area 200 is selected based on the difference between the accuracies of the printer 100 detected by such a unit.

For example, when the accuracy at which the recording medium 5 moves in the transport operation is less than the accuracy at which the recording head 13 moves in the pass operation, that is, when the deviation between the landing positions of the dots is larger in the sub scanning direction than in the main scanning direction, in order to reduce the deviation between the landing positions of the dots in the sub scanning direction, the pass is selected such that the number of transport operations performed while the area 200 is recorded is reduced.

Example 4

Figure 15:
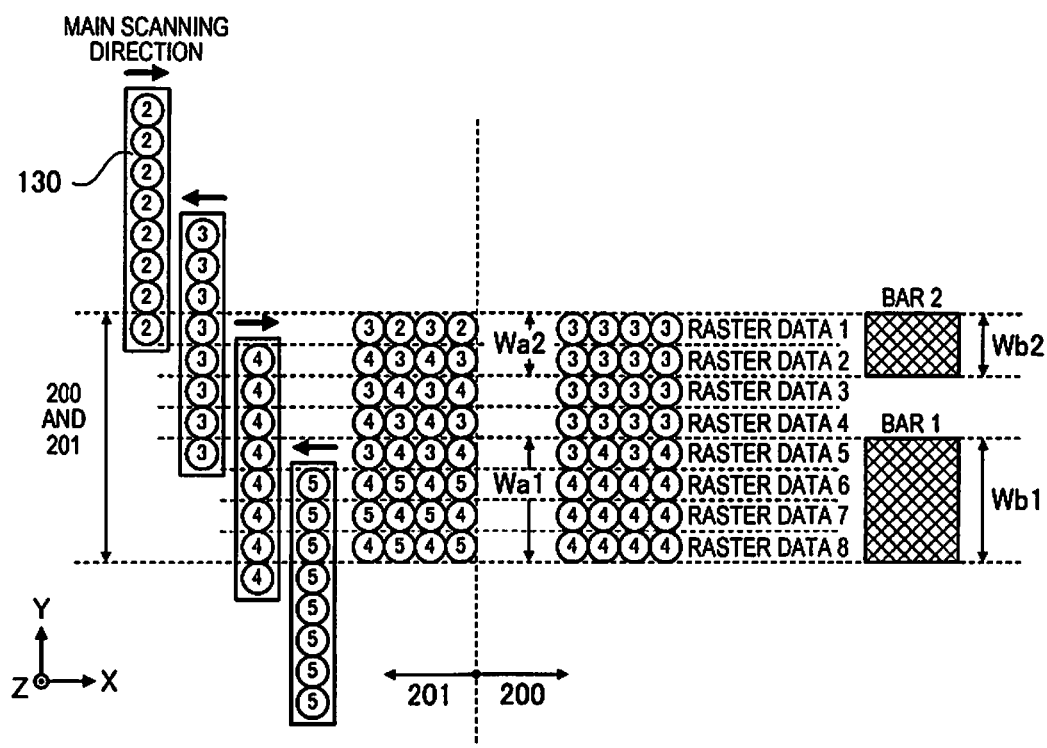
FIG. 15 is a schematic view showing a positional relationship between the nozzle for recording the area including the code information and the area adjacent to the area including the code information in the main scanning direction and the dot on the recording medium according to Example 4.

FIG. 15 shows a positional relationship between a nozzle for recording the area 200 and the area 201 and a dot on the recording medium 5 according to Example 4.

The present Example corresponds to FIG. 13, and the operation of recording the area 201 is the same as that of Example 3. Meanwhile, in the area 200, the pass for recording the area 200 is the same as that according to Example 3. However, a pass for recording a raster line corresponding to the raster data 5 is different from that according to Example 3. In detail, in Example 3, the raster line corresponding to the raster data 5 is recorded by one pass operation of the third pass. However, in the present Example, the raster line is recorded by two pass operations of the third pass and the fourth pass. In other words, the area 200 is divided into two areas corresponding to the raster data 1 to 4 and the raster data 6 to 8, recording on the divided areas is performed in one pass operation, and only the raster line corresponding to the raster data 5 which is a boundary portion is recorded by two pass operations.

According to the present Example shown in FIG. 15, it is possible to reduce the influence of the deviation between the landing positions of the dots on the area 200 including code information. For example, in the transport operation between the third pass and the fourth pass, when a large error occurs in the transport distance of the recording medium 5, in the configuration shown in FIG. 14, there is a possibility that a gap may be made between the raster data 5 and the raster data 6. When the code information is formed in this manner, the raster line corresponding to the raster data 5 may be recognized as a bar that is different from the area corresponding to the raster data 6 to 8, and thus, the code quality may deteriorate. Thus, only the raster line corresponding to the raster data 5, which is a boundary between the raster data 1 to 4 recorded in the third pass and the raster data 6 to 8 recorded in the fourth pass, is recorded by two pass operations. Thus, even when a large error occurs in the transport distance, it is possible to prevent occurrence of the gap.

In this way, it is not necessary to record each raster line included in the area 200 including the code information in one pass operation, and it is possible to suppress the deterioration of the quality of the code information even when some raster lines are recorded in two pass operations. Instead of one raster line, the plurality of raster lines may be recorded in two pass operations. Further, in the area 201, since the area 202 and the recording operation, specifically, the number of times of the pass operation and the main scanning direction (the unidirectional recording or the bidirectional recording) are the same, the image quality deterioration such as the color unevenness does not occur. Thus, according to the present Example, both the quality of the code information and the printing quality can be achieved.

That is, in the present Example, the recording controller 110 controls to record at least a part of the area 200 (the first area) in one pass operation.

Example 5

Figure 16:
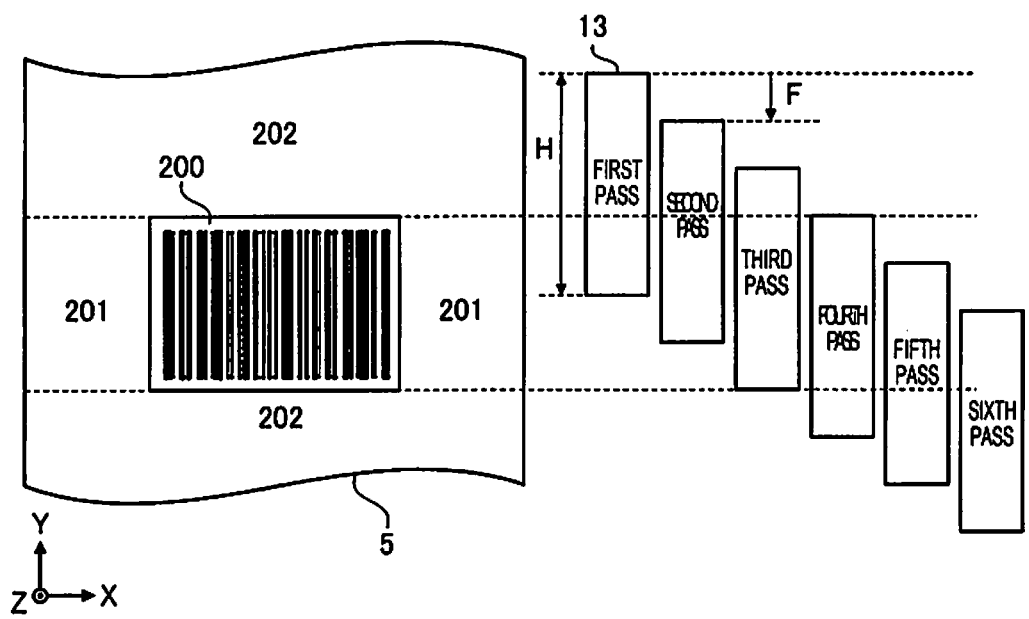
FIG. 16 is a schematic view showing a positional relationship between the recording head, the recording medium, and the area including the code information according to Example 5.

FIG. 16 shows a positional relationship between the recording head 13, the recording medium 5, and the area 200 according to Example 5.

For convenience of illustration, although only the pass for recording the area 200 is extracted and is illustrated as the first to sixth passes. However, actually, there are passes before and after the extraction.

Figure 17:
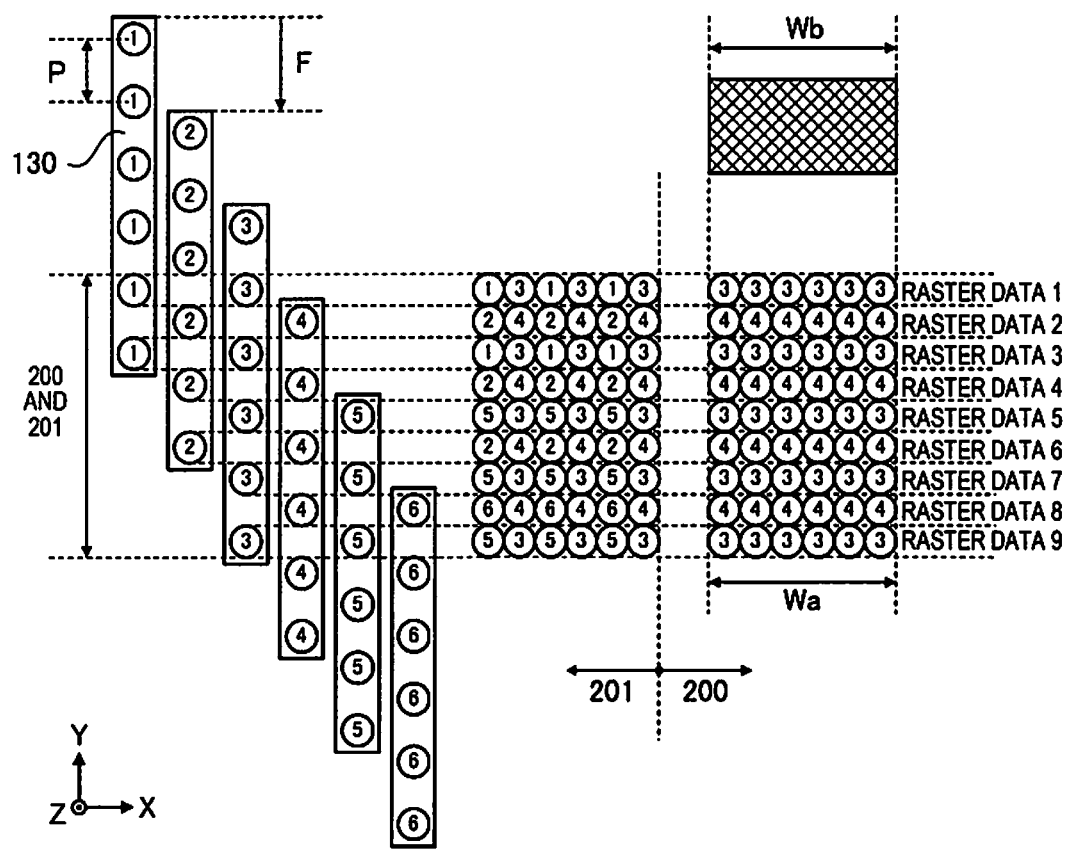
FIG. 17 is a schematic view showing a positional relationship between the nozzle for recording the area including the code information and the area adjacent to the area including the code information in the main scanning direction and the dot on the recording medium, which corresponds to FIG. 16.

FIG. 17 shows a positional relationship between a nozzle for recording the area 200 and the area 201 and a dot on the recording medium 5, to correspond to FIG. 16.

The movement amount F of the head is set to move the position of the nozzle in the sub scanning direction to a position where the nozzle pitch P is further shifted by +1/2P. Accordingly, it is possible to perform recording at a resolution that is finer than the resolution of the nozzle.

Focusing on the area 201, as every other dot formed in each pass operation is thinned out, one row of raster lines is recorded by two pass operations, and the entire area 201 is formed by six pass operations.

Meanwhile, in the area 200, the one row of the raster lines is recorded by one pass operation without dot thinning, and the entire area 200 is recorded by two pass operations of the third pass and the fourth pass.

According to a recording operation of the present Example shown in FIG. 17, it is possible to reduce the influence of the deviation between the landing positions of the dots on the area 200 including the code information. For example, when the head is inclined and attached, a nozzle having the largest deviation between the landing positions of the dots in the main scanning direction with respect to a nozzle at an upper end of the nozzle row 130 is a nozzle at a lower end of the nozzle row 130. Thus, when the raster line formed by the nozzle at the upper end is close to the raster line formed by the nozzle at the lower end, thickening and tapering of the bar width increase. In other words, as passes of recording the same raster line or adjacent raster lines become further apart from each other (as the accumulation of the movement amount F becomes larger), the error of the bar width becomes large. When the present disclosure is not applied (when the recording operation of the area 201 is performed), for example, as the raster line recorded by the first pass and the raster line recorded by the fourth pass are adjacent to each other, the landing deviation of the dots resulting from an inclination of the head becomes large. In contrast, according to the recording operation of the present Example, the entire area 200 is configured only by the third pass and the fourth pass, and influence of the deviation between the landing positions of the dots, caused by the inclination of the head, is small. Further, As the number of passes of recording the area 200 is reduced to the number of passes for recording the area 201, it is also possible to suppress the influence of the deviation between the landing positions of the dots due to the error of the transport distance of the recording medium 5, which has been described in Example 3.

Further, in the area 201, since the area 202 and the recording operation, specifically, the number of times of the pass operation and the main scanning direction (the unidirectional recording or the bidirectional recording) are the same, the image quality deterioration such as the color unevenness does not occur. Thus, according to the present Example, both the quality of the code information and the printing quality can be achieved.

That is, in the present Example, the recording controller 110 controls such that the number of times of the pass operation of recording the area 200 (the first area) is smaller than the number of times of the pass operation of recording the area 201 (the second area) adjacent to the area 200 in the main scanning direction.

Example 6

Figure 18:
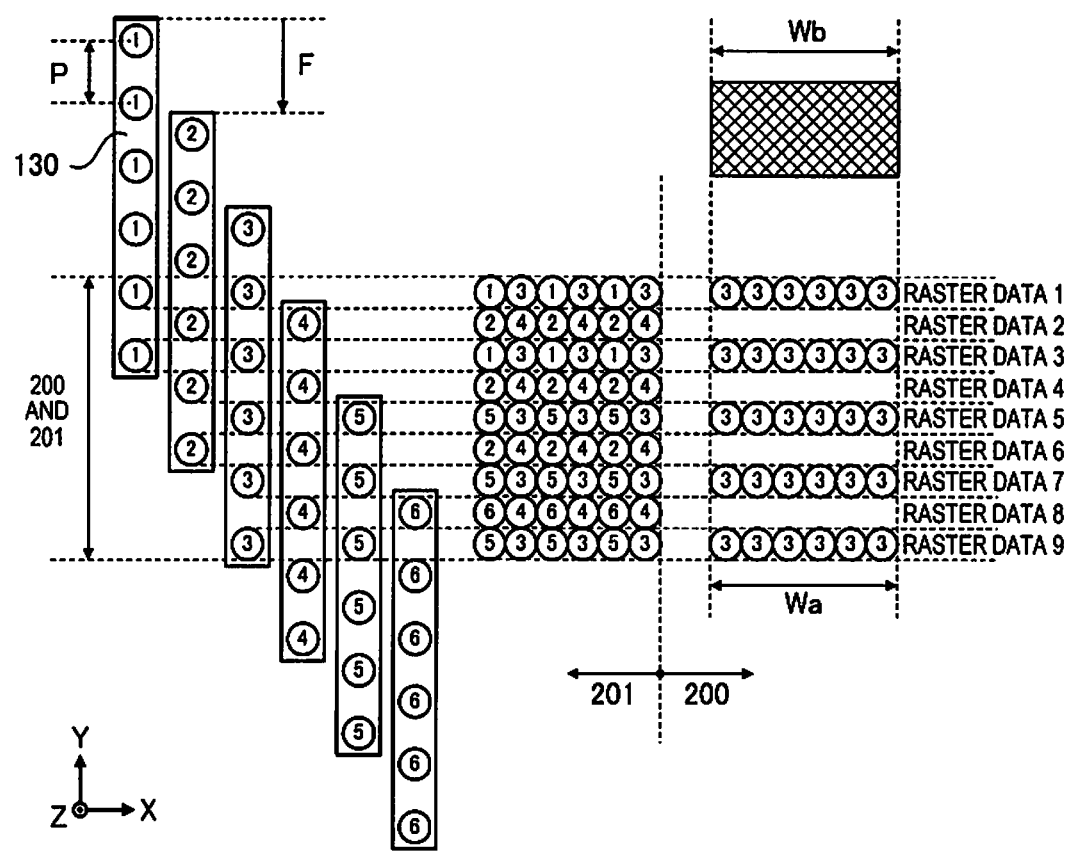
FIG. 18 is a schematic view showing a positional relationship between the nozzle for recording the area including the code information and the area adjacent to the area including the code information in the main scanning direction and the dot on the recording medium according to Example 6.

FIG. 18 shows a positional relationship between a nozzle for recording the area 200 and the area 201 and a dot on the recording medium 5 according to Example 6.

The present Example corresponds to FIG. 16, and the operation of recording the area 201 is the same as that of Example 5. Meanwhile, in the area 200, the recording is performed only in one pass operation of the third pass. As a result, every other dot is recorded in the sub scanning direction. That is, the recording resolution of the area 200 in the sub scanning direction is a half of that of the area 201.

According to the recording operation of the present Example shown in FIG. 18, it is possible to record the area 200 including the code information without influence of the deviation between the landing positions of the dots. The area 200 is recorded only by one pass operation, and is thus not affected by the deviation between the landing positions of the dots occurring due to various factors such as the inclination of the head, the difference of the head in the scanning direction, and the error of the recording medium 5 in the transport distance.

In this way, as the recording resolution of the area 200 is lower than that of the area 201, the number of times of the pass operation of recording the area 200 is smaller than that of Example 5, it is possible to record the code information while further suppressing the influence of the deviation between the landing positions of the dots. Further, in the area 201, since the area 202 and the recording operation, specifically, the number of times of the pass operation and the main scanning direction (the unidirectional recording or the bidirectional recording) are the same, the image quality deterioration such as the color unevenness does not occur. Thus, according to the present Example, both the quality of the code information and the printing quality can be achieved.

That is, in the present Example, the recording controller 110 controls such that the area 200 (the first area) is recorded at a recording resolution that is lower than that of the area 201 (the second area).

Method of Generating Recording Data in Embodiment 1

Figure 19:
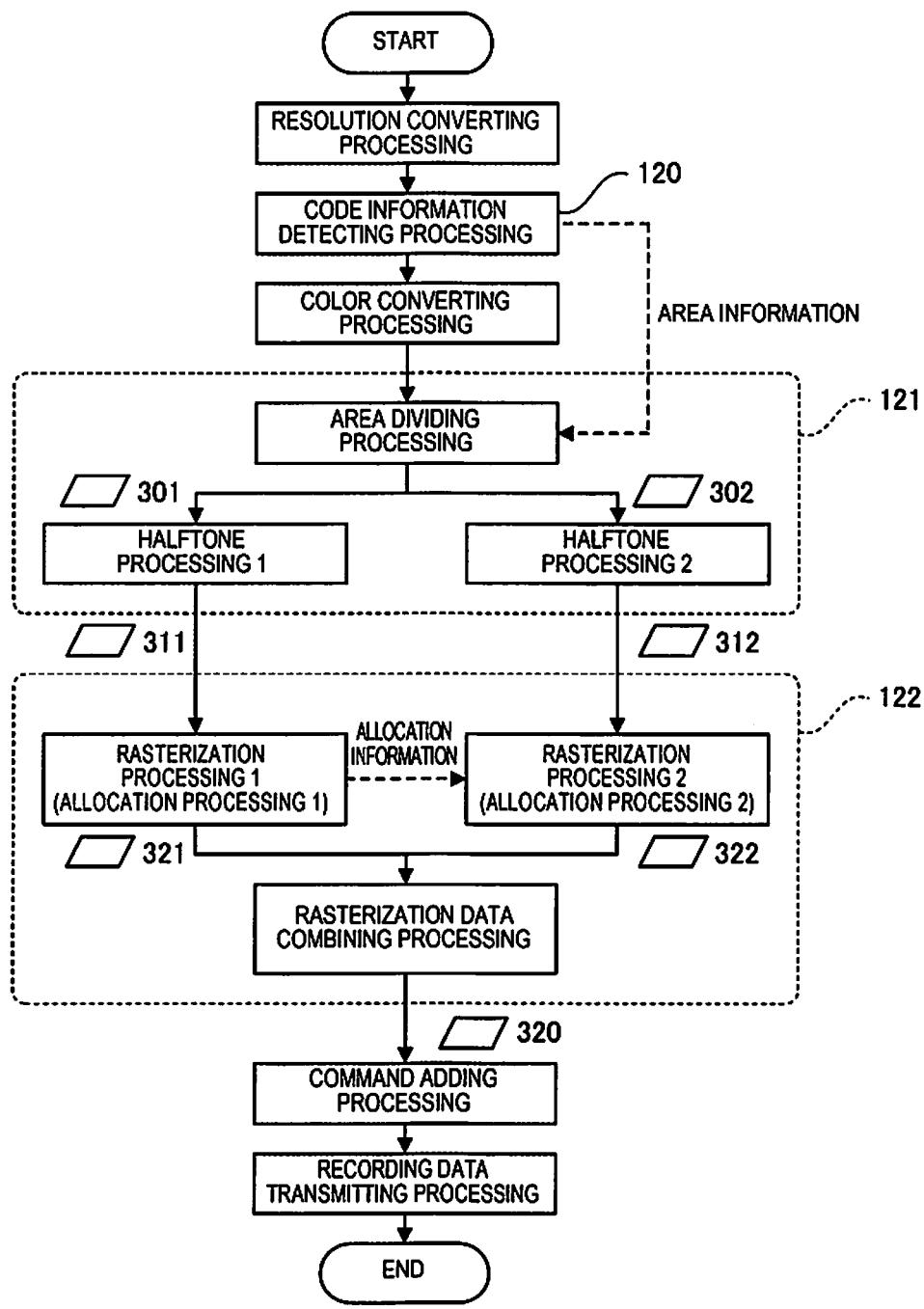
FIG. 19 is a flowchart showing a method of generating recording data according to Embodiment 1.

FIG. 19 is a flowchart showing a method of generating recording data according to the present embodiment.

In the present embodiment, the recording method includes a code detecting step of detecting the area 200 (the first area) where the code information 210 is located and a recording controlling step of controlling the printer 100 using the recording data. The recording controlling step is a step of controlling the printer 100 through the recording data such that the number of times of the pass operation of recording the area 200 is smaller than the number of times of the pass operation of recording the area 201. Further, the code detecting step is included in a step of generating the recording data. Thus, the step of generating the recording data, which will be described below, also corresponds to description of the recording method.

Hereinafter, the method of generating the recording data according to the present embodiment, in other words, the recording method according to the present embodiment, will be described with reference to FIG. 19.

The resolution converting processing is processing of converting the image data output from the application into a resolution when the image data is recorded in the recording medium 5. The resolution converting processing can use the same function as the printer driver according to the related art.

In the code information detecting processing 120 (the code detecting process), the code information 210 rather than the image data is detected, and information for specifying the area 200, the area 201, and the area 202 in the bitmap image data after the resolution converting processing is generated. The method of detecting the code information 210 is as described in the above-described code detecting unit.

The color converting processing is processing of converting the RGB data into data of a CMYK color system space.

The color converting processing can use the same function as the printer driver according to the related art.

The halftone processing 121 is processing of converting data having a high gradation number (256 gradations) into data having a gradation number that can be formed in the printer 100. In the area dividing processing, using the area information generated in the code information detecting processing 120, the image data after the color converting processing is divided into image data 301 corresponding to the area 201 and the area 202 and image data 302 corresponding to the area 200. Subsequently, by halftone processing 1, the image data 301 is converted into halftone data 311 corresponding to the area 201 and the area 202. Similarly, by halftone processing 2, the image data 302 is converted into halftone data 312 corresponding to the area 200. Halftone data is data for determining a formation state of a dot, and examples of the halftone data include, for example, 1-bit data indicating two gradations (with or without a dot) and 2-bit data indicating four gradations (without a dot or with a small dot, a medium dot, or a large dot). The same method as the printer driver according to the related art can be used as a detailed determination method.

Further, as shown in Example 6, in order to make the recording resolution of the area 200 lower than that of the area 201, for example, with regard to a dither mask used in the dither method, different processing from halftone processing 1 and halftone processing 2 may be used. In detail, for example, in the dither mask used in halftone processing 2, all thresholds are set to maximum values every other row. In the dither method, since a dot is formed only at a pixel where a gradation value of the image data exceeds a threshold of the dither mask, a dot is not formed at a pixel where the dither mask is set to a maximum value. That is, when such a dither mask is used, dots are not formed every other row (every other raster data), so that the recoding resolution in the sub scanning direction can be reduced. Alternatively, after halftone processing 2, a step of deleting data (undoing formation of the dot) forming a dot every other raster data with respect to the halftone data 312 may be added. According to such a configuration, the recording resolution of the area 200 can be reduced regardless of the contents of halftone processing 2.

The rasterization processing 122 is processing of rearranging pixel data arranged in a matrix (for example, 1-bit or 2-bit halftone data as described above) in a dot formation order at a time of recording.

Rasterization processing 1 includes allocation processing 1 in which image data configured by the halftone data 311 is allocated to each pass operation. When allocation processing 1 is completed, the halftone data 311 is allocated to a nozzle forming the raster line in each pass operation, so that rasterization data 321 is generated. Further, when one raster line is formed in a plurality of pass operations, for example, dots formed in each pass operation may be thinned out by using the dither pattern having noise characteristics. The rasterization data 321 generated in this manner is data corresponding to the area 201 and the area 202. For example, in the case of Example 1 (see FIG. 6), there is data corresponding to five pass operations from the first pass to the fifth pass. Further, allocation information obtained in rasterization processing 1, for example, correspondence information of a raster line and a nozzle in each pass operation, and the like, is transferred to rasterization processing 2.

Rasterization processing 2 includes allocation processing 2 in which image data configured by the halftone data 312 is allocated to each pass operation of recording the area 200, depending on the allocation information received from rasterization processing 1. When allocation processing 2 is completed, the halftone data 312 is allocated to a nozzle forming the raster line in each pass operation of recording the area 200, so that rasterization data 322 is generated. The rasterization data 322 is data corresponding to the area 200. For example, in the case of Example 1, there is data corresponding to one pass operation of the third pass.

Subsequently, in rasterization data combining processing, data of passes corresponding to the rasterization data 321 and the rasterization data 322 are combined with each other to generate rasterization data 320. For example, in the case of Embodiment 1, the rasterization data 321 and the rasterization data 322 of the third pass are combined with each other. Rasterization data of the first and second passes and rasterization data of the fourth and fifth passes are not combined. The term "combining" herein may mean a logical sum of two pieces of the rasterization data. The rasterization data 320 generated in this manner includes data corresponding to the area 201, the area 202, and the area 200.

The command adding processing is processing of adding command data according to a recording method to rasterization data. The command data includes, for example, transport data related to a transport specification (a movement amount, a velocity, and the like in the sub scanning direction) of the recording medium 5.

In recording data transmitting processing, recording data including command data and rasterization data is transmitted to the printer 100 via the printer interface unit 119.

The printer 100 that receives the recording data causes the controller 30 to control the recording unit 10 and the movement unit 20 based on the recording data, and records an image (forms an image) on the recording medium 5.

That is, the recording method according to the present embodiment includes a code detecting process of detecting the area 200 (the first area) where the code information 210 included in the image data is located, and a recording controlling step of controlling the pass operation and the transport operation based on the image data and a result of the detection in the code detecting step. In the recording controlling step, control is performed such that the number of times of the pass operations for recording the area 200 is smaller than the number of times of the pass operations for recording the area 201 (the second area) adjacent to the area 200 in the main scanning direction.

As described above, the recording method according to the present disclosure can be realized only by a function of the printer driver, and it is not necessary to change another component, for example, the printer 100, and the like. Thus, the recording method can be realized without increasing costs of the printer 100, and can be applied to an already completed printer 100 by using software, hardware, or the like.

As described above, according to the recording apparatus (the recording system 1) according to the present embodiment, the following effects can be obtained.

As the number of times of the pass operation of recording the area 200 including the code information is reduced, for example, it is possible to suppress the deviation between the landing positions of the dots, which occurs when the recording is performed by the plurality of pass operations, such as an installation error of the head, a transport error of the recording medium 5, and a cock ring of the recording medium 5, and it is possible to record the code information with high quality.

At the same time, as the number of times of the pass operation of recording the area 201 adjacent to the area 200 including the code information in the main scanning direction increases, it is possible to improve printing quality such as enhancing the color development, increasing the resolution, and improving graininess. Further, as the number of times of the pass operation of the area 202 adjacent to the area 200 or the area 201 is the same as the number of times of the pass operation of the area 201 in the sub scanning direction, a difference between the printing qualities of the area 201 and the area 202 can be eliminated, so that the image quality deterioration such as the color unevenness does not occur.

In this way, according to the recording apparatus according to the present embodiment, it is possible to achieve both the quality of the code information and the printing quality, which cannot be simultaneously achieved in the related art.

Embodiment 2

In Embodiment 1, although the embodiment has been described in which an example of the recording system 1 including the printer 100 is the "recording apparatus", the present embodiment is an embodiment in which the printer 100 is not provided and a "recording controlling device" for controlling the printer 100 is provided.

That is, the recording controller 110, which is a "recording controlling device" for controlling the printer 100, includes a code detecting unit that detects the area 200 (the first area) where the code information 210 included in the image data is located and a recording controller 110 that controls the pass operation and the transport operation based on the image data and a result of the detection by the code detecting unit. The recording controller 110 controls such that the number of times the pass operations for recording the area 200 is smaller than the number of times of the pass operations for recording the area 201 (the second area) adjacent to the area 200 in the main scanning direction.

According to the "recording controlling device" according to the present embodiment, the recording in which the effect described in Embodiment 1 is exhibited can be performed by the printer 100, which is a control target.

Hereinafter, the contents derived from the above-described embodiments will be described.

A recording apparatus for recording a recording image based on image data by repeating a pass operation in which a nozzle group discharges ink while moving relatively to a recording medium in a main scanning direction and a transport operation in which the nozzle group and the recording medium relatively move in a sub scanning direction intersecting the main scanning direction is provided. The recording apparatus includes a code detecting unit that detects a first area where code information included in the image data is located, and a recording controller that controls the pass operation and the transport operation based on the image data and a result of the detection by the code detecting unit, in which the recording controller controls such that the number of times of the pass operation of recording the first area is smaller than the number of times of the pass operation of recording a second area adjacent to the first area in the main scanning direction.

With this configuration, as the first area where the code information is located is specified by the code detecting unit, and the recording controller controls such that the number of times of the pass operation of recording the first area is smaller than the number of times of the pass operation of recording the second area, for example, it is possible to suppress the deviation between the landing positions of the dots, which occurs when the recording is performed by the plurality of pass operations, such as an installation error of the head, a transport error of the recording medium, and a cock ring of the recording medium, and it is possible to record the code information with high quality.

At the same time, as control is performed such that the number of times of the pass operation of recording the second area is more than the number of times of the pass operation of recording the first area, it is possible to improve printing quality such as enhancing the color development, increasing the resolution, and improving graininess. In detail, as the number of times of the pass operation increases, the amount of ink applied to the recording medium once is reduced. By making the penetration of the ink into the recording medium shallow, a large amount of coloring materials stays near the surface of the recording medium, making it possible to enhance the color development. Further, as the number of times of the pass operation increases, the resolution can be increased. Further, as the resolution increases, since the size of the ink droplets can be reduced, graininess can also be improved.

In this way, according to the present configuration, improvement in the quality of the code information and improvement in the printing quality can be achieved at the same time.

In the recording apparatus, the recording controller may control to record at least a part of the first area in the one pass operation.

With this configuration, since the first area is recorded by one pass operation, for example, there is no deviation between the landing positions of the dots, which occurs when the recording is performed by the plurality of pass operations, such as an installation error of the head, a transport error of the recording medium, and a cock ring of the recording medium, and it is possible to record the code information with high quality.

Further, for example, the first area may be divided into two areas in the sub scanning direction, each of the divided areas may be recorded by one pass operation, and only a boundary portion between the divided parts may be recorded by two pass operations. That is, at least a part of the first area is recorded by one pass operation. With this configuration, since each of the divided areas is recorded by one pass operation, for example, there is no deviation between the landing positions of the dots, which occurs when the recording is performed by the plurality of pass operations, such as an installation error of the head, a transport error of the recording medium, and a cock ring of the recording medium, and when a bar indicating the code information exists in a boundary portion between the divided areas, it is possible to suppress a reduction in the quality of the code information. For example, by an error of the transport distance of the recording medium, it is possible to prevent a gap from being formed between the divided areas and to form a space in the bar located at the boundary portion between the divided areas.

In the recording apparatus, the recording controller may control to record the first area at a recording resolution that is less than a recording resolution of the second area.

With this configuration, the number of times of the pass operation of recording the first area can be reduced as compared to the number of times of the pass operation of recording the first area at the same recording resolution as the second area. For example, when the recording resolution of the second area in the sub scanning direction is higher than a resolution of the head, as the resolution of the first area in the sub scanning direction becomes equal to the resolution of the head, the first area can be recorded by one pass operation.

Accordingly, for example, it is possible to suppress the deviation between the landing positions of the dots, which occurs when the recording is performed by the plurality of pass operations, such as an installation error of the head, a transport error of the recording medium, and a cock ring of the recording medium, and it is possible to record the code information with high quality.

In the recording apparatus, the recording controller may control such that when the first area cannot be recorded by the one pass operation, the first area is recorded by a first pass operation and a second pass operation after the first pass operation, and the first pass operation and the second pass operation are performed in the same main scanning direction.

With this configuration, even when the second area is recorded by bidirectional main scanning of the head, and there is the deviation between the landing position of the dot discharged in a forward pass and the landing position of the dot discharged in a rearward pass, control is performed such that the main scanning directions of the pass operations of recording the first area are the same, and thus the deviation between landing positions of the dots forming the first area does not occur. Thus, it is possible to record the code information with high quality.

In the recording apparatus, the recording controller may control such that when the first area cannot be recorded by the one pass operation, the first area is recorded by a first pass operation and a second pass operation after the first pass operation, and the first pass operation and the second pass operation are performed in different main scanning directions.

With this configuration, when the second area is recorded by the bidirectional main scanning of the head, and the deviation of the landing positions of the dots of the second area occurs due to the error of the transport distance of the recording medium, as control is performed such that the first area is recorded by the pass operation in a different main scanning direction, it is possible to reduce the total number of transport operations generated during the pass operation of recording the first area. As a result, it is possible to suppress accumulation of the error of the transport distance of the recording medium, and to reduce the deviation between the landing positions of the dots. Thus, it is possible to record the code information with high quality.

In the recording apparatus, the recording controller may control such that the number of times of the pass operation of recording a third area adjacent to the first area or the second area in the sub scanning direction is equal to the number of times of the pass operation of recording the second area.

With this configuration, the recording controller controls such that the numbers of times of the pass operations of recording the second area and the third area are the same, so that it is possible to make no difference when the same kind of object is recorded in the second area and the third area. For example, as the number of times of the pass operation of recording the second area is different from the number of times of the pass operation of recording the third area, a difference occurs in color and density, so that it is possible to prevent the image quality deterioration such as the so-called color unevenness.

A recording method of recording a recording image based on image data by repeating a pass operation in which a nozzle group discharges ink while moving relatively to a recording medium in a main scanning direction and a transport operation in which the nozzle group and the recording medium relatively move in a sub scanning direction intersecting the main scanning direction is provided. The method includes a code detecting step of detecting a first area where code information included in the image data is located, and a recording controlling step of controlling the pass operation and the transport operation based on the image data and a result of the detection in the code detecting step, in which in the recording controlling step, control is performed such that the number of times of the pass operation of recording the first area is smaller than the number of times of the pass operation of recording a second area adjacent to the first area.

With this configuration, as the first area where the code information is located is specified by the code detecting step, and controls are performed in the recording controlling step such that the number of times of the pass operation of recording the first area is smaller than the number of times of the pass operation of recording the second area, for example, it is possible to suppress the deviation between the landing positions of the dots, which occurs when the recording is performed by the plurality of pass operations, such as an installation error of the head, a transport error of the recording medium, and a cock ring of the recording medium, and it is possible to record the code information with high quality.

At the same time, as control is performed such that the number of times of the pass operation of recording the second area is more than the number of times of the pass operation of recording the first area, it is possible to improve printing quality such as enhancing the color development, increasing the resolution, and improving graininess. In detail, as the number of times of the pass operation increases, the amount of ink applied to the recording medium once is reduced. By making the penetration of the ink into the recording medium shallow, a large amount of coloring materials stays near the surface of the recording medium, making it possible to enhance the color development. Further, as the number of times of the pass operation increases, the resolution can be increased. Further, as the resolution increases, since the size of the ink droplets can be reduced, graininess can also be improved.

In this way, according to the present configuration, improvement in the quality of the code information and improvement in the printing quality can be achieved at the same time.

A recording controlling device for controlling a recording apparatus for recording a recording image based on image data by repeating a pass operation in which a nozzle group discharges ink while moving relatively to a recording medium in a main scanning direction and a transport operation in which the nozzle group and the recording medium relatively move in a sub scanning direction intersecting the main scanning direction is provided. The recording controlling device includes a code detecting unit that detects a first area where code information included in the image data is located, and a recording controller that controls the pass operation and the transport operation based on the image data and a result of the detection by the code detecting unit, in which the recording controller controls such that the number of times of the pass operation of recording the first area is smaller than the number of times of the pass operation of recording a second area adjacent to the first area in the main scanning direction.

With this configuration, as the first area where the code information is located is specified by the code detecting unit, and the recording controller controls such that the number of times of the pass operation of recording the first area is smaller than the number of times of the pass operation of recording the second area, for example, it is possible to suppress the deviation between the landing positions of the dots, which occurs when the recording is performed by the plurality of pass operations, such as an installation error of the head, a transport error of the recording medium, and a cock ring of the recording medium, and it is possible to record the code information with high quality.

At the same time, as control is performed such that the number of times of the pass operation of recording the second area is more than the number of times of the pass operation of recording the first area, it is possible to improve printing quality such as enhancing the color development, increasing the resolution, and improving graininess. In detail, as the number of times of the pass operation increases, the amount of ink applied to the recording medium once is reduced. By making the penetration of the ink into the recording medium shallow, a large amount of coloring materials stays near the surface of the recording medium, making it possible to enhance the color development. Further, as the number of times of the pass operation increases, the resolution can be increased. Further, as the resolution increases, since the size of the ink droplets can be reduced, graininess can also be improved.

In this way, according to the present configuration, it is possible to perform recording in which improvement in the quality of the code information and improvement in the printing quality can be achieved in the recording apparatus at the same time.

What is claimed is:

1. A recording apparatus for recording a recording image based on image data by repeating a pass operation in which a nozzle group discharges ink while moving relatively to a recording medium in a main scanning direction and a transport operation in which the nozzle group and the recording medium relatively move in a sub scanning direction intersecting the main scanning direction, the apparatus comprising:
a code detecting unit that detects a first area where code information included in the image data is located; and
a recording controller that controls the pass operation and the transport operation based on the image data and a result of the detection by the code detecting unit, wherein
the recording controller controls such that the number of times of the pass operation of recording the first area is smaller than the number of times of the pass operation of recording a second area adjacent to the first area in the main scanning direction, and
the recording controller divides the first area such that the first area includes at least a first part and a second part that are arranged in the sub scanning direction and each of which is formed of a plurality of raster lines along the main scanning direction, and the recording controller controls the pass operation and the transport operation such that the second part is recorded after the first part is recorded, and such that each of the first and second parts is recorded in only one pass operation.

2. The recording apparatus according to claim 1, wherein the recording controller controls to record the first area at a recording resolution that is less than a recording resolution of the second area.

3. The recording apparatus according to claim 1, wherein a first pass operation in which the first part is recorded and a second pass operation in which the second part is recorded are performed in the same main scanning direction.

4. The recording apparatus according to claim 1, wherein a first pass operation in which the first part is recorded and a second pass operation in which the second part is recorded are performed in different main scanning directions.

5. The recording apparatus according to claim 1, wherein the recording controller controls such that the number of times of the pass operation of recording a third area adjacent to the first area or the second area in the sub scanning direction is equal to the number of times of the pass operation of recording the second area.

6. The recording apparatus according to claim 1, wherein the recording controller divides the first area such that the first area further includes a third part between the first and second parts in the sub scanning direction, and the recording controller controls the pass operation and the transport operation to record the third part in two pass operations.

7. A recording method of recording a recording image based on image data by repeating a pass operation in which a nozzle group discharges ink while moving relatively to a recording medium in a main scanning direction and a transport operation in which the nozzle group and the recording medium relatively move in a sub scanning direction intersecting the main scanning direction, the method comprising:
detecting a first area where code information included in the image data is located; and
controlling the pass operation and the transport operation based on the image data and a result of the detection in the detecting of the first area, wherein
in the controlling of the pass operation and the transport operation, control is performed such that the number of times of the pass operation of recording the first area is smaller than the number of times of the pass operation of recording a second area adjacent to the first area in the main scanning direction, and
in the controlling of the pass operation and the transport operation, the first area is divided such that the first area includes at least a first part and a second part that are arranged in the sub scanning direction and each of which is formed of a plurality of raster lines along the main scanning direction, the second part is recorded after the first part is recorded, and each of the first and second parts is recorded in only one pass operation.

8. A recording controlling device for controlling a recording apparatus for recording a recording image based on image data by repeating a pass operation in which a nozzle group discharges ink while moving relatively to a recording medium in a main scanning direction and a transport operation in which the nozzle group and the recording medium relatively move in a sub scanning direction intersecting the main scanning direction, the device comprising:
a code detecting unit that detects a first area where code information included in the image data is located; and
a recording controller that controls the pass operation and the transport operation based on the image data and a result of the detection by the code detecting unit, wherein
the recording controller controls such that the number of times of the pass operation of recording the first area is smaller than the number of times of the pass operation of recording a second area adjacent to the first area in the main scanning direction, and the recording controller divides the first area such that the first area includes at least a first part and a second part that are arranged in the sub scanning direction and each of which is formed of a plurality of raster lines along the main scanning direction, and the recording controller controls the pass operation and the transport operation such that the second part is recorded after the first part is recorded, and such that each of the first and second parts is recorded in only one pass operation.

* * * * *